United States Patent
Morrison et al.

(10) Patent No.: US 10,967,261 B2
(45) Date of Patent: Apr. 6, 2021

(54) PHYSICAL ELEMENT LINKED COMPUTER GAMING METHODS AND SYSTEMS

(71) Applicants: 2525168 ONTARIO INC., Gloucester (CA); 2271240 ONTARIO INC., Ottawa (CA)

(72) Inventors: Cory William Morrison, Gloucester (CA); Richard Thomas Morrison, Ottawa (CA); Rodrigo Alcides Amador, Gloucester (CA)

(73) Assignees: Cory William Morrison, Gloucester (CA); Richard Thomas Morrison, Ottawa (CA)

( * ) Notice: Subject to any disclaimer, the term of this patent is extended or adjusted under 35 U.S.C. 154(b) by 295 days.

(21) Appl. No.: 16/087,168

(22) PCT Filed: Mar. 22, 2017

(86) PCT No.: PCT/CA2017/000065
§ 371 (c)(1),
(2) Date: Sep. 21, 2018

(87) PCT Pub. No.: WO2017/161440
PCT Pub. Date: Sep. 28, 2017

(65) Prior Publication Data
US 2020/0346111 A1 Nov. 5, 2020

Related U.S. Application Data

(60) Provisional application No. 62/311,527, filed on Mar. 22, 2016.

(51) Int. Cl.
*A63F 13/428* (2014.01)
*A63F 13/212* (2014.01)
*A63F 13/35* (2014.01)

(52) U.S. Cl.
CPC .......... *A63F 13/428* (2014.09); *A63F 13/212* (2014.09); *A63F 13/35* (2014.09)

(58) Field of Classification Search
CPC ...... A63F 13/35; A63F 13/428; A63F 13/212; A63F 13/537; A63F 13/49
See application file for complete search history.

(56) References Cited

U.S. PATENT DOCUMENTS 7,397,464 B1 * 7/2008 Robbins ................. G06F 3/0425
345/156
2007/0117602 A1 * 5/2007 Madigou ............. A63F 3/00643
463/14

(Continued)

OTHER PUBLICATIONS

Diablowiki.net, "Hardcore", 2013, at https://diablo2.diablowiki.net/Hardcore, pp. 1-6, (last visited Oct. 30, 2020). (Year: 2013).*

*Primary Examiner* — Steve Rowland
(74) *Attorney, Agent, or Firm* — Rosenberg, Klein & Lee

(57) ABSTRACT

Modern computer based gaming in contrast to traditional gaming does not present the user/player with "responsibility" in that failure has negligible or no consequences and losing an element or part of the game is now essentially limited to failure of the standalone gaming console or failure to maintain an active account with some premium Internet based gaming applications. However, if the player's character within a game was linked to a physical element that stored their data in a secure manner and was required physically to electronically connect to the gaming system for the player to play then loss of the physical element means loss of the avatar. Similarly, if the securely stored data is written down to zero upon the death of the avatar within the game then the system may prevent the user restoring their game to a prior point to replay and avoid their failure.

17 Claims, 14 Drawing Sheets

(56) References Cited

U.S. PATENT DOCUMENTS

| | | | |
|---|---|---|---|
| 2009/0197658 A1* | 8/2009 | Polchin | A63F 13/02 463/9 |
| 2010/0004062 A1* | 1/2010 | Maharbiz | A63F 3/00643 463/36 |
| 2015/0258459 A1* | 9/2015 | Scott | A63F 13/00 463/43 |
| 2016/0325180 A1* | 11/2016 | Nelson | A63F 13/355 |
| 2017/0203204 A1* | 7/2017 | Lowe | A63F 13/95 |

* cited by examiner

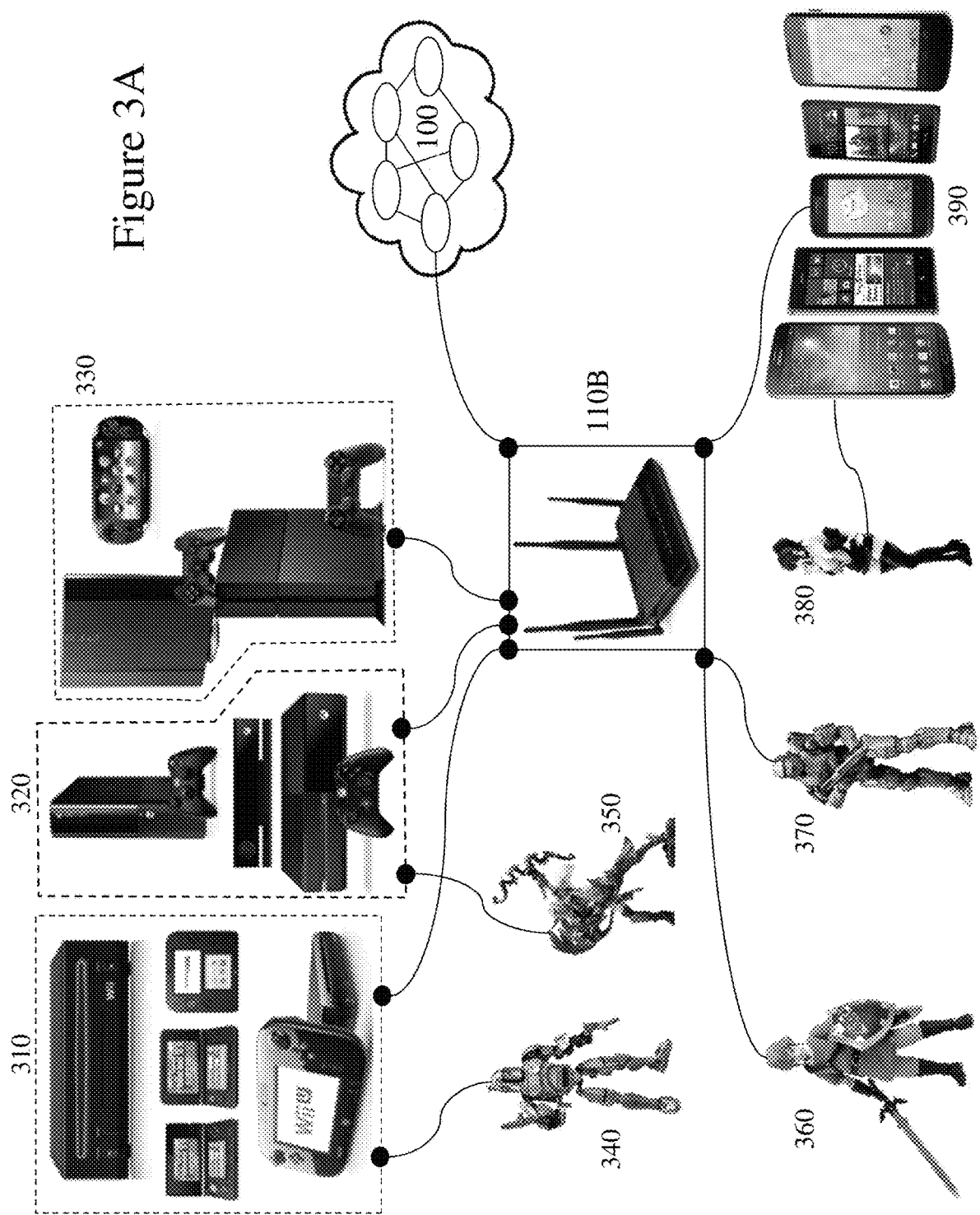

PHYSICAL ELEMENT LINKED COMPUTER GAMING METHODS AND SYSTEMS

CROSS-REFERENCE TO RELATED APPLICATIONS

This patent application claims the benefit of priority as a 371 National Phase Entry of PCT/2017/000,065 filed Mar. 22, 2017 entitled "Physical Element Linked Computer Gaming Methods and Systems" which itself claims the benefit of priority from U.S. Provisional Patent Application 62/311,527 filed Mar. 22, 2016 entitled "Physical Element Linked Computer Gaming Methods and Systems", the entire contents of each being incorporated herein by reference.

FIELD OF THE INVENTION

This invention relates to electronic gaming and more particularly to physical devices that uniquely store aspects of the user's personalized gaming avatar together with their evolution and adaptation to reflect the user's progress within one or more gaming environments.

BACKGROUND OF THE INVENTION

Over the past decade the increasing power of microprocessors coupled with low cost electronic solutions, supporting cellular wireless services as well as personal and local area networks (PANs/LANs), low cost colour displays, social networks, and a range of different software applications have meant that gaming consoles and portable gaming devices have become a significant aspect of entertainment for children and adults alike. Despite gaming consoles for domestic use going back approximately 40 years to the Magnavox Odyssey their progress in the past 20 years since the first Sony™ PlayStation has benefitted from LCD/LED displays, dedicated graphic processors, wireless interfaces and increased residential Internet connectivity and data rates.

At the same time portable gaming devices such as the Nintendo™ DS, Sony™ PlayStation Vita, Nintendo Wii U etc. and now smartphones available from multiple suppliers such as Apple™ Samsung™, and Google™ with wireless interfaces, high resolution LED displays, and increased microprocessor power mean that today users access gaming software programs and software applications through a variety of graphical user interfaces (GUIs) allowing the users to interact through graphical icons and visual indicators such as secondary notation, as opposed to text-based interfaces, typed command labels or text navigation. Evolving virtual reality (VR) systems as well as motion tracking systems such as Microsoft™ Kinect™ and gyroscopes in controllers, smartphones, etc. also allow users to perceive and interact with the virtual worlds within games in more natural manners than through buttons, joysticks, etc. of conventional gaming controllers.

Generally, within gaming environments the user employs within these GUIs an avatar (usually translated from Sanskrit as incarnation) that represents or provides a graphical representation of the user or the user's alter ego or character within the game or games. Today, the most varied and sophisticated avatars are within the realms of massively multiplayer online games (MMOGs) where players in some instances may construct a wholly customized representation from a range of available templates and then customize through preset hairstyles, skin tones, clothing, etc. Avatars may take any form, and range from lifelike humans to robots, animals, plants and mythical creatures. Avatar customization is one of the most important entertainment aspects in gaming and non-gaming virtual worlds and many such virtual worlds provide tools to customize their representations, allowing them to change shapes, hair, skins, gender, and also genre. Moreover, there is a growing secondary industry devoted to the creations of products and items for the avatars. Some companies have also launched social networks and other websites for linking avatars from different virtual worlds such as Koinup, Myrl, and Avatars United.

Such avatars are solely defined within the gaming environment and are provided to the user upon their re-starting the game, whether online or stand-alone, and either defaulting to their avatar based upon their registration/login or selecting one of the available avatars. If the user's avatar died during the game, then they can re-start from scratch or from a previously stored point within the game. Accordingly, modern gaming in contrast to traditional games does not present the user/player with what the inventors call "responsibility" in that failure has negligible or no consequences and losing an element or part of the game is now essentially limited to failure of the standalone gaming console or failure to maintain an active account with some premium Internet based gaming applications.

In many instances, computer games have had associated independent merchandising including figures of gaming characters, e.g. Mario and Luigi from Mario Bros.™ by Nintendo™. Recently, in an expansion of marketing such figures, several gaming companies and one console manufacturer, Nintendo™, have launched concepts for figures that extend the basic physical figure into a very limited aspect of a game or games and raise the "sales pitch" accordingly on players or parents respectively according to the target age range of the game. These concepts include:

Nintendo™ Amiibo™ wherein the figure of a character when coupled to the gaming console via Near-Field Communication (NFC) unlock new characters, content and bonuses. This being a simple detection of the figure triggering the release of bonuses, characters, etc. within the game. Some figures store limited game data from specific games but are limited to data from one game even if the character can be used in multiple games;

Disney™ Infinity which a multi-game console system working on Microsoft™ Xbox™ Microsoft™ Windows™ devices, Google™ Android™ smartphones, and Sony™ Playstation™. Requiring a Universal Serial Bus (USB) hub each character can store limited level and health information whilst so-called "world discs" unlock playsets/campaigns etc. whilst "power discs" unlock items, vehicles, etc.;

Lego™ Dimensions is a multi-game concept for the dominant consoles such as Microsoft™ Xbox™, Sony™ Playstation™, and Nintendo™ Wii™ and require an expensive Lego™ hub wherein the base of a character stores character and level information whilst the top can be modified, varied, etc. as it is standard Lego™;

Skylander™ Superchargers again exploit a hub with figures storing level and health information together with upgraded powers and statistics. These figures may also be reset whilst in-game.

The storage capacity of these figures is very limited. For example, the Lego™ Dimensions figures store 180 bytes of data. A Nintendo™ Amiibo™ for example when tapped to a compatible console unlocks the character, allows the user to select an outfit and give it a nickname which is then stored back to the Amiibo™ figure when it is tapped again to the compatible console. However, a user can play all games compatible with Amiibo™ without using an Amiibo™ figure and as such the Amiibo™ is optional and will simply add new elements to the gameplay, depending on the game.

Equally, losing a figure has relatively minor consequence as evident from Disney Infinity. Whilst a replacement figure must be purchased to unlock the character then provided it is unused the console/software assign an ownership of the character to the figure but now rather than starting at level 0 as when the lost figure was first used it will now load the figure with the experience level the player achieved previously, which it gets this from the game data. Further, in order to avoid data loss, the user can make backup copies of the data via a USB stick, cloud storage, etc.

Accordingly, whilst such figures release characters, release bonus content, etc. they do not fundamentally change the nature of the user's interaction with the game. In many instances the game can be played without the figures as these merely unlock other aspects of the game or loss of the figure is overcome with the purchase of another and exploiting in-game saved character data. In contrast, a gamer before the domination of computer gaming could only play with the correct piece and/or all pieces. Further, in physical games loss would mean destruction of the player's piece. As such a player established a direct sense of ownership and responsibility towards their playing piece(s) or gaming elements in a manner not present in today's computer gaming.

Equally, the progression of a player's playing piece through a series of victories added value to it wherein typically, especially with children, such pieces would be traded/bartered/sold for other items or playing pieces etc. In contrast, today within online gaming players may seek access to a variety of cheats etc. in order to bypass certain elements, power up weapons etc. without actually spending the time, pain, frustration and effort to progress through the game. It would, therefore, be beneficial for a player's character to be based within a figure that stores progress allowing either verification during a trade that the progress was legitimately achieved or providing a mechanism within the game for blocking use of characters that have been artificially boosted or progressed.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to electronic gaming and more particularly to physical devices that uniquely store aspects of the user's personalized gaming avatar together with their evolution and adaptation to reflect the user's progress within one or more gaming environments In accordance with an embodiment of the invention there is provided a method of providing data relating to an avatar to a game in execution upon an electronic device, wherein the data relating to an avatar is stored within non-volatile, non-transitory memory of a physical element and transmitted to the electronic device upon associating the physical element with the electronic device and the loss of the physical element results in loss of the data relating to an avatar.

In accordance with an embodiment of the invention there is provided a method of storing data relating to an avatar within a game, wherein the data relating to an avatar is stored within non-volatile, non-transitory memory of a physical element and transmitted to the electronic device upon associating the physical element with the electronic device and the data relating to the avatar is securely overwritten during playing of the game to reflect the avatar's actions and performance within the game.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3A depicts the association of figures with gaming consoles and PEDs according to an embodiment of the invention;

DETAILED DESCRIPTION

Figure 1:
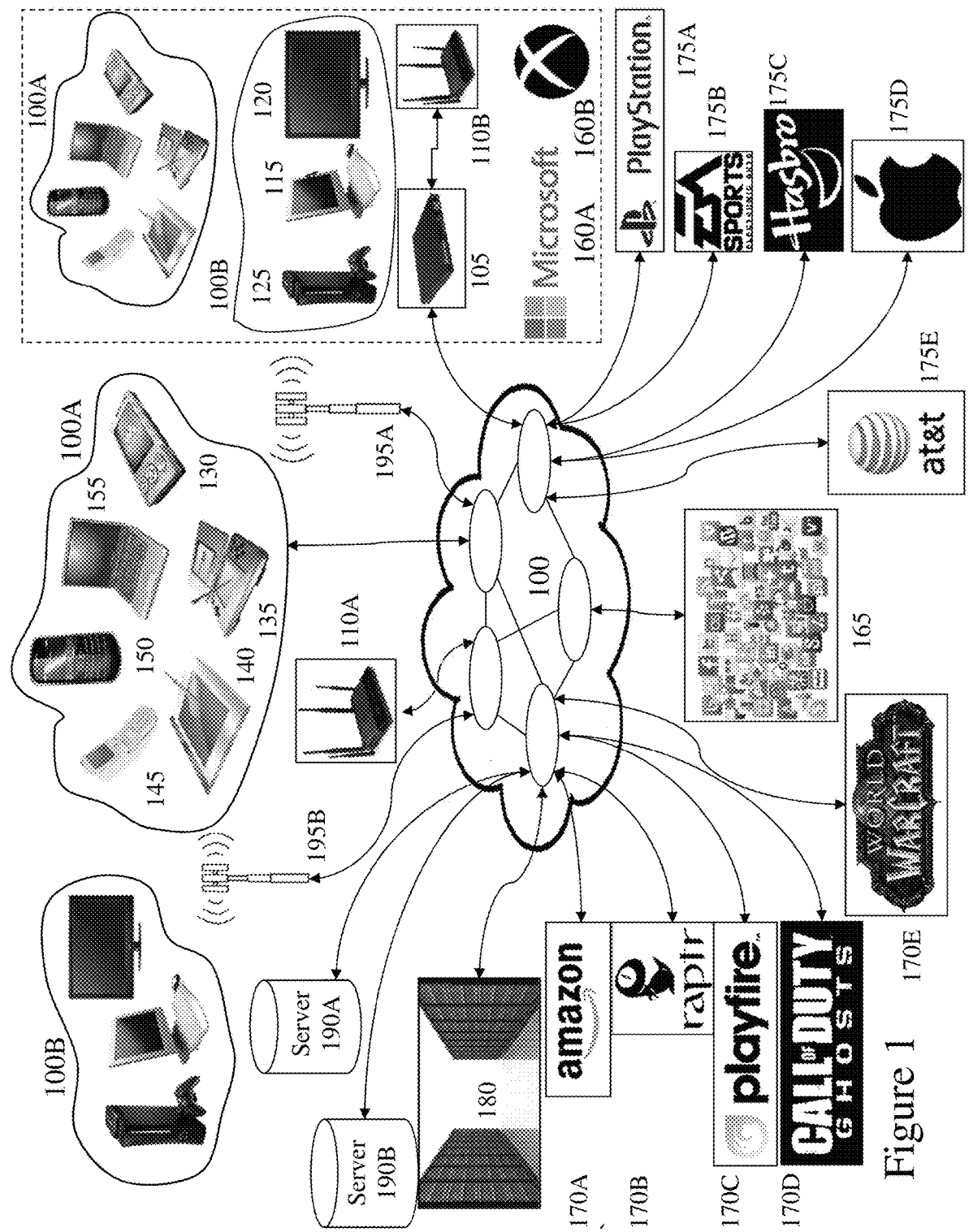
FIG. 1 depicts a network environment within which embodiments of the invention may be employed.

The present invention is directed to electronic gaming and more particularly to physical devices that uniquely store aspects of the user's personalized gaming avatar together with their evolution and adaptation to reflect the user's progress within one or more gaming environments The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by data relating to a subset of conditions including, but not limited to, their environment, medical condition, condition, biological condition, physiological condition, chemical condition, ambient environment condition, position condition, neurological condition, drug condition, and one or more specific aspects of one or more of these said conditions.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, heart rate, temperate, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request; said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, any information included in the document, information derivable from information included in the document (referred to as "document derived information"), and/or information related to the document (referred to as "document related information"), as well as an extension of such information (e.g., information derived from related information). An example of document derived information is a classification based on textual content of a document. Examples of document related information include document information from other documents with links to the instant document, as well as document information from other documents to which the instant document links.

A "character device" (CHARDEV), "figure", "game piece" or "gaming piece" as used herein may refer to, but is not limited to, a physical object supporting bidirectional communications with a PED and/or FED storing data relating to an avatar within a computer game, computer games, video game, video games, online game, online games, software application etc. Such CHARDEVs may, optionally, be visually representative of a character/vehicle/asset/gaming element within the game in respect of appearance, clothing, etc. Alternatively, a CHARDEV may be visually non-representative of the character/vehicle/asset/gaming element and its identity established electronically in isolation or in conjunction with user applied marking/decoration etc. Each CHARDEV stores characteristics of the avatar with which it is associated such that the avatar is unique to the user and accumulates data relating to the user's progress, rewards, losses, bonuses, level, health etc. Optionally, the CHARDEV data is locked and encrypted preventing replication of the avatar and/or recovery of the avatar to a previous condition/state. Optionally, the CHARDEV data provides a unique fingerprint of progress wherein exploiting available cheats, boosts, etc. relating to the game(s) and/or character the avatar represents blocks the avatar from further use or provides a potential acquirer with data proofing the avatar's progress has been "faked" or artificially established.

A "computer game", "personal computer game" as used herein may refer to, but is not limited to, video games played on a computer, e.g. personal computer, laptop computer, tablet computer, etc. rather than a dedicated video game console or arcade machine. Common defining characteristics include a lack of any centralized controlling authority, a greater degree of user control over the video-gaming hardware and software used and a generally greater capacity in input, processing, and output.

A "gaming console" or "video game console" as used herein may refer to, but is not intended to, an electronic device and/or electronic system that provides a video signal or visual image to display a video game to a user or users. The term "video game console" is used to distinguish a console primarily designed for consumers to use for playing video games in contrast to arcade machines or personal computers etc. A gaming console may include, but is not limited to, a home video game consoles, handheld game consoles, micro-consoles and dedicated consoles.

A "video game" as used herein may refer to, but is not intended to, an electronic game that involves human interaction with a user interface to generate visual feedback on a video device such as a television, smartphone, or computer monitor. Traditionally, the word video in video game traditionally referred to a raster display device but today it implies any type of display device that can produce two- or three-dimensional images. The electronic systems used to play video games are known as platforms; examples of these being personal computers and video game consoles. These platforms range from large mainframe computers to distributed remote server systems, through to small handheld computing devices. Specialized video games include arcade games, in which the video game components are housed in a large chassis.

An "online game" as used herein may refer to, but is not limited to, an online game is a video game that is either partially or primarily played through the Internet or another computer network.

A "mobile game" as used herein may refer to, but is not limited to, a video game played on a feature phone, smartphone, smartwatch, PDA, tablet computer, portable media player or calculator. Mobile games may be downloaded from an application store associated with a provider of an operating system, e.g. Google Android, or provider of PEDs and/or FEDs, e.g. Samsung™, or a supplier of PEDs and/or FEDs exploiting a proprietary operating system, e.g. Apple™.

Within the descriptions below in respect of the associated figures and embodiments of the invention reference may be made to a "game", "computer game", "video game", "online game" and/or "mobile game" discretely or in combination. The use of one such term in isolation of the others or a subset of these terms is not intended to limit the application of the associated embodiment or embodiments of the invention to that term or subset of terms but rather may be applied to any other term, subset of terms, or all terms.

Referring to FIG. 1 there is depicted a network environment 100 within which embodiments of the invention may be employed supporting gaming element systems, applications, and platforms (GESAPs) according to embodiments of the invention. Such GESAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service provider's network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, such as General Electric™ or Microsoft™ for example, within which other first and second user groups 100A and 100B are disposed. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, personal service provider, e.g. Amazon™, first and second gaming communities 170B and 170C respectively, e.g. Raptr™ and Playfire™, first to second online gaming resources 170D and 170E respectively, e.g. Call of Duty™ Ghosts and World of Warcraft™, as well as first and second servers 190A and 190B which together with others, not shown for clarity. Also connected are gaming console original equipment manufacturer (OEM) 175A, e.g. Sony™ maker of the PlayStation, gaming software provider 175B, e.g. Electronic Arts™ (EA), a toy manufacturer 175C, e.g. Hasbro™, an electronics OEM 175D, e.g. Apple™, and telecom service provider 175E, e.g. AT&T. Accordingly, a user employing one or more GESAPs may through their avatar and/or avatar characteristics interact with one or more such providers, enterprises, and third parties.

First and second servers 190A and 190B may host according to embodiments of the inventions multiple services associated with a provider of gaming element systems, applications, and platforms (GESAPs); a provider of a SOCNET or Social Media (SOME) exploiting GESAP features; a provider of a SOCNET and/or SOME not exploiting GESAP features; a provider of services to PEDS and/or FEDS; a provider of one or more aspects of wired and/or wireless communications; an Enterprise 160 exploiting GESAP features; license databases; content databases; image databases; content libraries; customer databases; websites; and software applications for download to or access by FEDs and/or PEDs exploiting and/or hosting GESAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides GESAP features according to embodiments of the invention; execute an application already installed providing GESAP features; execute a web based application providing GESAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
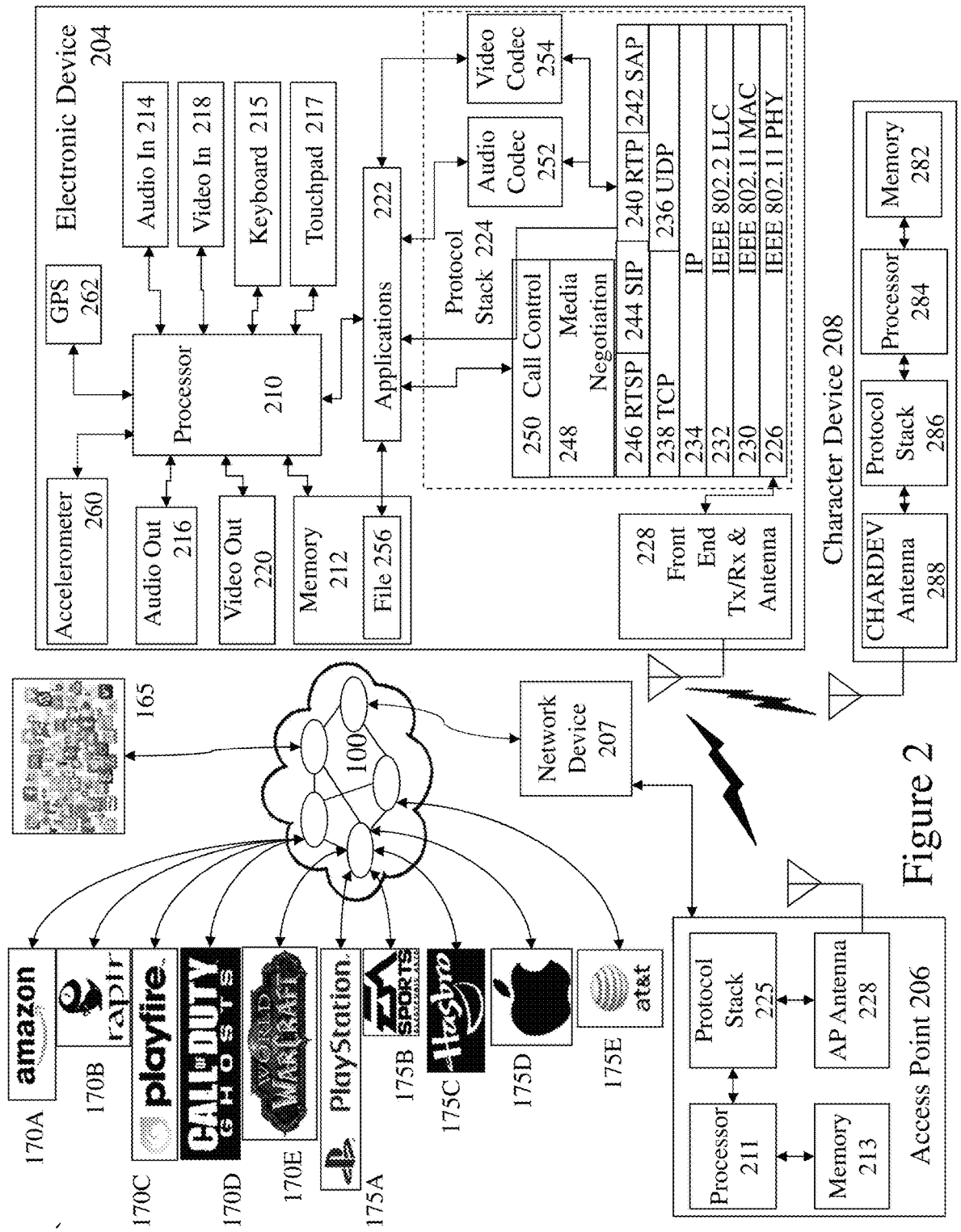
FIG. 2 depicts a wireless portable electronic device supporting communications to a network such as depicted in FIG. 1 and as supporting embodiments of the invention.

Now referring to FIG. 2 there is depicted an ELectronic DEVice (ELDEV) 204, for example a PED or FED, and network access point 207 supporting GESAP features according to embodiments of the invention. ELDEV 204 may, for example, be a PED and/or FED and may include additional elements above and beyond those described and depicted. Also depicted within the ELDEV 204 is the protocol architecture as part of a simplified functional diagram of a system 200 that includes an ELDEV 204, such as a smartphone 155 or gaming console 125, an access point (AP) 206, such as first AP 110, one or more character devices (gaming elements) 208, and one or more network devices 207, such as communication servers, streaming media servers, and routers for example such as first and second servers 190A and 190B respectively.

Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, Also connected to the network 100 are Social Networks (SOCNETS) 165, personal service provider, e.g. Amazon™, first and second gaming communities 170B and 170C respectively, e.g. Raptr™ and Playfire™, first to second online gaming resources 170D and 170E respectively, e.g. Call of Duty™ Ghosts and World of Warcraft™, as well as first and second servers 190A and 190B which together with others, not shown for clarity. Also connected are gaming console original equipment manufacturer (OEM) 175A, e.g. Sony™ maker of the PlayStation, gaming software provider 175B, e.g. Electronic Arts™ (EA), a toy manufacturer 175C, e.g. Hasbro™, an electronics OEM 175D, e.g. Apple™, and telecom service provider 175E, e.g. AT&T. Accordingly, a user employing one or more GESAPs may through their avatar and/or avatar characteristics interact with one or more such providers, enterprises, and third parties.

The ELDEV 204 is depicted as coupled to the AP 206 and the one or more CHARacter DEVices (CHARDEVs) 208 by wireless links. However, it would be evident that the ELDEV 204 and AP 206 may be connected by a wired link or an optical link. Similarly, CHARDEV 208 may be connected to ELDEV 204 via short range wireless link, e.g. Bluetooth or Near-Field Communications (NFC) or a medium range wireless link, e.g. IEEE 802.11, IEE 802.16. Alternatively, optical communication links may be employed and, in some instances, wired communication links or long range wireless communication links.

The ELDEV 204 includes one or more processors 210 and a memory 212 coupled to processor(s) 210. Similarly, AP 206 also includes one or more processors 211 and a memory 213 coupled to processor(s) 211 whilst CHAracter DEVice (CHADEV) 208 includes one or more processor(s) 284 and a memory 282 coupled to the processor(s) 284. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

ELDEV 204 may include an audio input element 214, for example a microphone, and an audio output element 216, for example, a speaker, coupled to any of processors 210. ELDEV 204 may include a video input element 218, for example, a video camera or camera, and a video output element 220, for example an LCD display, coupled to any of processors 210. ELDEV 204 also includes a keyboard 215 and touchpad 217 which may for example be a physical keyboard and touchpad allowing the user to enter content or select functions within one of more applications 222. Alternatively, the keyboard 215 and touchpad 217 may be pre-determined regions of a touch sensitive element forming part of the display within the ELDEV 204. The one or more applications 222 that are typically stored in memory 212 and are executable by any combination of processors 210. ELDEV 204 also includes accelerometer 260 providing three-dimensional motion input to the process 210 and GPS 262 which provides geographical location information to processor 210.

Each of the ELDEV 204, AP 206, and CHARDEV 208 include protocol stacks, namely ELDEV protocol stack 224, AP protocol stack 225, and CHARDEV protocol stack 286 respectively. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of ELDEV protocol stack 224, AP protocol stack 225, and CHARDEV protocol stack 286 may be implemented in any combination of software, firmware and/or hardware. ELDEV protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238. In similar manner AP protocol stack 225 is coupled to AP antenna 228 and CHARDEV protocol stack 286 is coupled to CHARDEV antenna 288.

Whilst ELDEV protocol stack 224 and AP protocol stack 225 are depicted based upon an IEEE 802.11 wireless interface the ELDEV 204 may exploit a second protocol stack, not shown for clarity, together with CHARDEV protocol stack 286 supporting a different wireless interface such as Bluetooth, NFC etc. Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the ELDEV 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by ELDEV 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Now referring to FIG. 3A there is depict schematically the association of figures with gaming consoles and PEDs according to an embodiment of the invention via an access point (AP) such as AP 206 in FIG. 2 which in this instance is Wi-Fi node 110B from FIG. 1. Whilst within FIG. 2 ELDEV 204 is consistent with a PED such as a smartphone it would also be evident to one of skill in the art that the ELDEV 204 is functionally very similar to that of a gaming console with wireless network interface, applications, processor, memory, audio in/out, video in/out, etc. wherein some interface elements are omitted and replaced with external controller/external haptic interfaces that may also include accelerometers, joysticks, buttons, sliders, etc. Whilst within FIG. 3A there are depicted first to third console groups 310 to 330 respectively representing different portable and fixed console options. These are depicted as coupled via an access point, Wi-Fi node 110B, and therein to network 100. Also coupled to the Wi-Fi node 110B are PEDs 390 such as smartphones. Coupled to first and second console groups 310 and 320 respectively are first and second CHARDEVs 340 and 350 respectively, such as through IEEE 802.11 (Wi-Fi) or IEEE 802.15 (Bluetooth, ZigBee etc.). Accordingly, first CHARDEV 340 represents "futuristic robot" LEGO™ figure which the user has in this instance associated with a game upon a console within first console group 310. In contrast, second CHARDEV 350 represents a Night Elf Hunter "Alathena Moonbreeze" from the World of Warcraft™ franchise which the user is employing in conjunction with a console from second console group 320. In each instance, the user may associate their figure with an appropriate game upon a different console either from the same manufacturer, e.g. console group, or a different manufacturer, e.g. different console group, provided that they exploit a common interface.

In contrast, third and fourth CHARDEVs 360 and 370 respectively are wirelessly coupled to the Wi-Fi node 110B and therein to either one of the first to third console groups 310 to 330 respectively or to a PED 390. Third CHSARDEV 360 representing "Link" the primary protagonist within the Legend of Zelda™ franchise whilst fourth CHARDEV 370 represents "Master Chief" the main protagonist within the Halo™ fictional universe. As such the user's game through associating with the Wi-Fi node 110B and joining a local network/group associated with the Wi-Fi node 110B may access other devices connected to the Wi-Fi node 110B such as the third and fourth CHARDEVs 360 and 370 respectively. Finally, fifth CHARDEV 380 is connected to a PED 390 directly, and represents a gaming figure associated with an adult game such as Senran Kagura Shinovi Versus for the PlayStation™ Vita™ which represents a genre known as eroge (hentai games) in Japan.

Accordingly, the figure(s) may be:
associated with games of any genre;
games targeted at any age range;
specific to a single game;
specific to a gaming franchise, e.g. Halo™;
specific to games associated with a particular enterprise, e.g. Lego™;
accessible to any game providing a "portal" for additional characters;
specific to a single game console;
specific to game consoles associated with a particular enterprise, e.g. Nintendo™;
open platform;
specific to an operating system, e.g. Android™; and
operating system agnostic of game and/or game console.

Figure 3B:
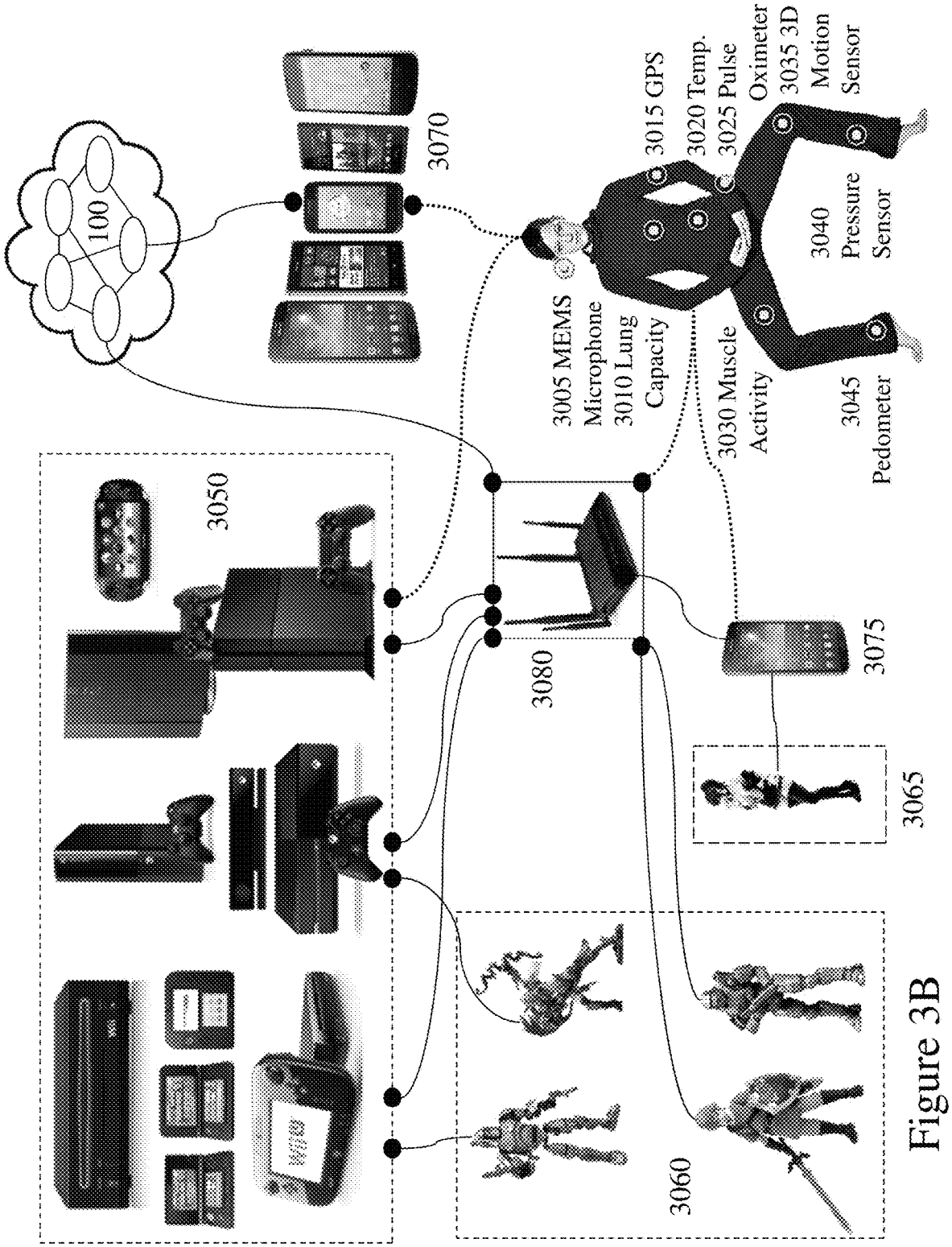
FIG. 3B depicts the association of figures with gaming consoles and PEDs in conjunction with wearable devices supporting biometric data acquisition and/or presentation to systems according to embodiments of the invention.

Now referring to FIG. 3B there is depicted the association of figures with gaming consoles and PEDs in conjunction with wearable devices supporting biometric data acquisition and/or presentation to systems according to embodiments of the invention. As depicted gaming figures 3060 may be coupled to console 3050, an AP 3080, or a PED 3075 as well as other FEDs other than consoles 3050 as described supra in respect of FIG. 3A. However, in contrast to FIG. 3A the user is now also connected to one or more of their PED 3075, the AP 3080, other PEDs 3070, and console 3050 in addition to one or more FEDs (not shown for clarity). These connections being the result of connections established by one or more sensors associated with the user including, but not limited to, MEMS microphone 3005, lung capacity detector 3010, GPS 3015, thermometer 3020, pulse oximeter 3025, muscle monitor 3030, 3D motion sensor 3035, pressure sensor 3040, and pedometer 3045. These representing examples of discrete biometric, environmental, and other sensors which may be used alone or in combination with one or more consolidator devices such as Samsung™ Gear™, Fitbit™ Blaze™, etc. or the user's PED 3075. Accordingly, a range of data related to the user may be acquired with respect to their gaming activity that may be employed within the game directly, by the game manufacturers etc.

Within embodiments of the invention the data may be employed to authorize access to the content stored upon a figure, e.g. voice recognition, or it may be employed in conjunction with user actions upon a console such that a user's joystick motion implying forward movement requires action of the user determined as walking to actually move the character within the game. Optionally, more aggressive user motion such as jogging or running may adjust the character's speed of motion within the game whilst other actions such as sideways, ducking, etc. may be captured and processed as character actions. In other embodiments the user cannot achieve an objective without expending the effort which can be monitored through motion and muscle/lung to avoid cheating. In other embodiments of the invention the user's biometrics may be processed to establish a "state of mind" or "state of body" of the user such that, for example, in a first person shooter game the user having been made to "jog" in real life to achieve an objective, e.g. cross an open region, must now control their breathing to make the "shot" as a sniper.

Whilst the processing of the user biometrics may be performed by the gaming console in order to ascertain user actions this data may be stored within the figure associated with the avatar the user is employing such that the characteristics of the avatar stored and employed within the game subsequently in addition to the progress and other data stored relating to the avatar's progress and performance within the game(s). Accordingly, a "Link" reaching a given progress point within a particular game, e.g. "Legend of Zelda", may now be unique in that the avatar's characteristics have been established based upon the user through not only their decisions and progress through the game but also as a result of the user's personal biometrics etc.

Figure 4:
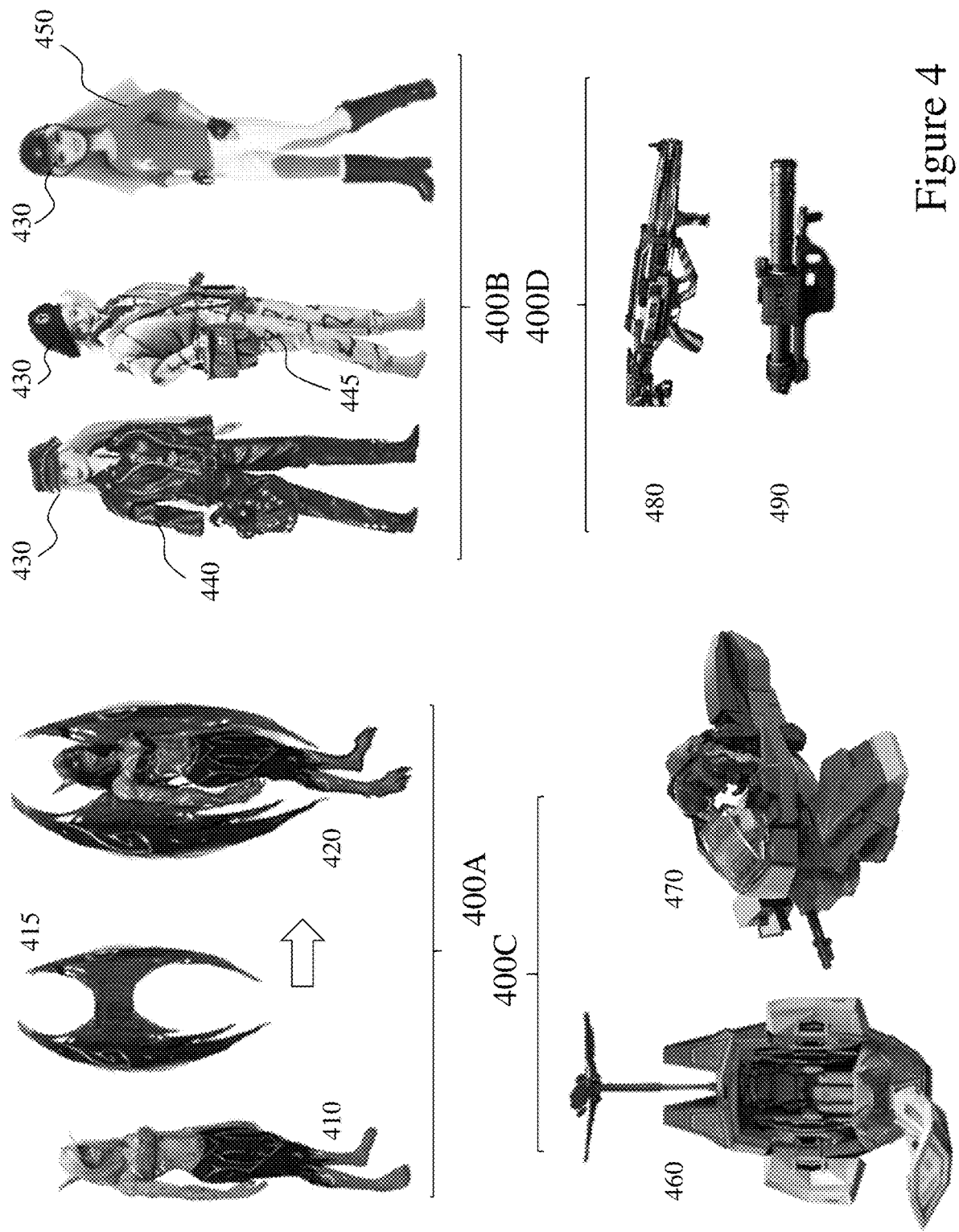
FIG. 4 depicts the association of additional gaming elements with a figure within embodiments of the invention.

Now referring to FIG. 4 there are depicted examples of the association of additional gaming elements with a figure within embodiments of the invention. Within the description supra in respect of FIGS. 3A and 3B a user's figure defines their avatar and evolves based upon their progress/performance within one of more games. However, a figure may be augmented, modified and/or upgraded through the addition of one or more gaming elements to the gaming figure. Further, as outlined supra and expanded in more detail below just as loss of a figure has a dramatic consequence to the user, e.g. loss of their avatar within the game(s), then the loss of a gaming element associated with a figure has a direct consequence, e.g. loss of the modification, upgrade, and/or augmentation. Accordingly, considering first set 400A there is depicted initial FIG. 410 relating to a character which provides the core functionality in respect of storing the avatar characteristics, performance, etc. Subsequently, the user purchases an add-on 415 associated with the character which when attached to the figure yields modified FIG. 420.

As the add-on 415 may include, for example, a radio frequency identification (RFID) tag its presence is detected by the initial FIG. 410 and the resulting modified FIG. 420 has properties, characteristics defined by the combination of the initial FIG. 410 and the add-on 415. Optionally, alternatives to conventional passive RFID may be employed such as RuBee (IEEE 1902.1) and Hewlett-Packard's Memory Spot as well as the add-on 415 making electrical contacts that provide a physical connection to read data from the add-on 415 or simply its identity. Accordingly, in some embodiments of the invention the presence of any add-on 415, provided it is the correct add-on for the initial FIG. 410, will trigger the same modification of the initial FIG. 410. However, in other embodiments of the invention "smart" add-ons may store data relating to the progress of the user's modified FIG. 420 so that a user's add-on 415 evolves and adjusts according to the user's game play.

This concept may be extended as depicted in FIG. 4 with second set 400B wherein a common initial FIG. 430 may be modified by the addition of different add-ons, depicted as first to third clothing items 440, 445 and 450 respectively. Accordingly, each add-on may adjust aspects of the avatar associated with the initial figure such as skills, behavior etc. Within other embodiments of the invention the add-on may, as indicated within third set 400C, be a vehicle which provides additional performance characteristics, options etc. and may be associated with a specific initial figure, may be associated with multiple initial figures, with a specific modified figure, or multiple modified figures. Similarly, as depicted in fourth set 400D first and second weapons 480 and 490 may be associated with a specific initial figure, may be associated with multiple initial figures, with a specific modified figure, or multiple modified figures.

Within some embodiments of the invention an add-on may be associated and active with the initial figure at any time whilst in others an add-on may only be active once the user's avatar has reached a certain threshold, objective, goal, experience etc. within the game. For example, within a franchise such as "Halo" the first weapon 480 in fourth set 400D may be active immediately it is associated with the initial figure by the user. However, second weapon 490 may require that the user complete a training program within the game, achieve a specific goal, etc. In this manner, add-ons may be sold discretely or in association with an initial figure, but a user cannot simply "power up" by acquiring add-ons. Within other embodiments of the invention as a user progresses through their game they may be prompted or advised that certain add-ons may be employed, acquired, etc. or have become inactive.

Figure 5:
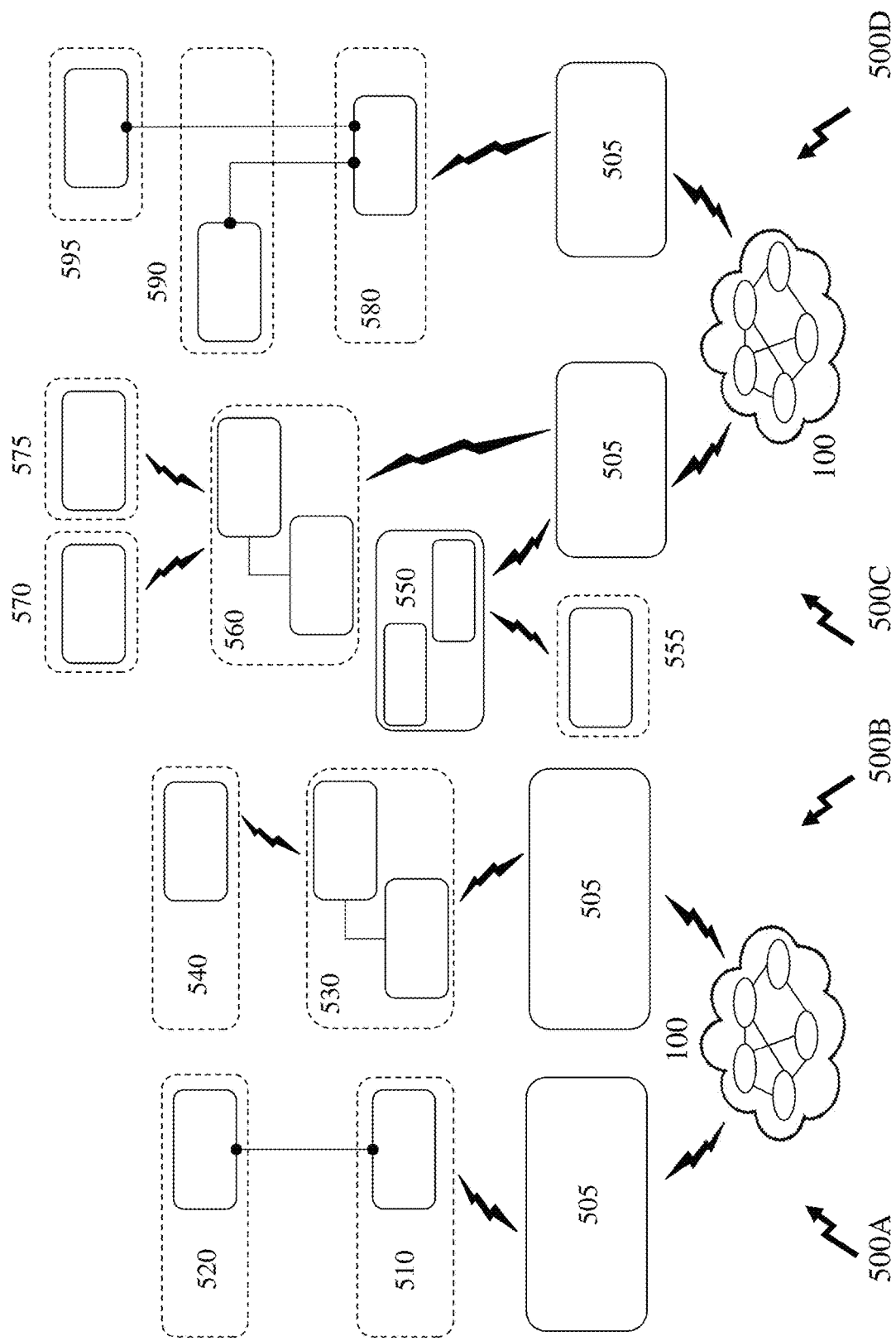
FIG. 5 depicts different additional gaming element/figure/console configurations as may be supported by embodiments of the invention.

Now referring to FIG. 5 there are depicted first to fourth configurations 5000A to 5000D respectively relating to different additional gaming element/figure/console configurations as may be supported by embodiments of the invention. First configuration 500A depicts a gaming console 505 wirelessly coupled to network 100 and having a first initial FIG. 510 with first add-on 520 wherein the first initial FIG. 510 is coupled to the gaming console 505 by a wireless link and to the first add-on 520 via a direct electrical connection. Second configuration 500B depicts a gaming console 505 wirelessly coupled to network 100 and having a second initial FIG. 530 with second add-on 540 wherein the second initial FIG. 530 is coupled to the gaming console 505 by a wireless link, e.g. Bluetooth, and to the second add-on via a wireless interface, e.g. NFC. In third configuration the gaming console 505 is wirelessly coupled to third and fourth initial FIGS. 550 and 560 respectively wherein third initial FIG. 550 is coupled to third add-on 555 and fourth initial FIG. 560 is coupled to fourth and fifth add-ons 570 and 575. Within fourth configuration the gaming console 505 is coupled to fifth initial FIG. 580 which is then coupled to sixth and seventh add-ons 590 and 595 wherein seventh add-on 595 is coupled to the fifth initial FIG. 580 via sixth add-on 590. Accordingly, add-ons may be coupled directly or indirectly to the figure.

In other embodiments of the invention an add-on may be coupled to the console directly rather than indirectly via a figure. As such it would be evident that a game might have different categories of initial figures and add-ons such that, for example, some add-ons may be figure agnostic in that they will provide their characteristic/power-up/benefit to any figure associated with them via a connection to the figure or via their connection to the console directly. Other add-ons may be specific to a figure or a specific set of figures. Some add-ons may require the presence of another add-on in order to be active. In some embodiments of the invention add-on elements may be wirelessly coupled to the gaming console directly rather than indirectly via an initial figure.

In some embodiments of the invention a hub may be employed in order to allow the avatar access to multiple add-on elements simultaneously or in rapid succession without requiring the user remove a first add-on element and attach a second add-on element. However, in some instances requiring the user remove a first add-on element and attach a second add-on element. However, in each of the different combinations the absence of an add-on removes the effect/characteristic of that add-on element so that the gamer must establish control and responsibility for both their initial figure and the add-on elements in order to exploit their avatar and its extended characteristics etc.

Figure 6:
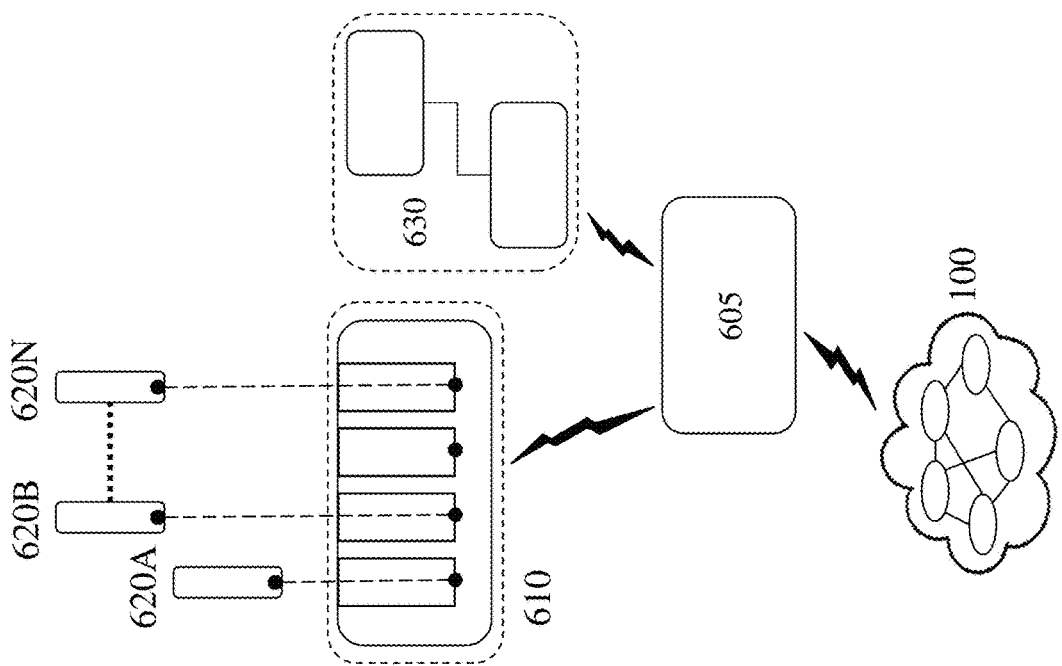
FIG. 6 depicts a hub based interface for multiple additional gaming elements associated with a figure within embodiments of the invention.

Within some embodiments of the invention the add-on elements associated with an initial figure may be two, three or more wherein each add-on represents, for example, a different skill or weapon. In many instances the user's avatar within the game may only need to select a skill or weapon or other characteristic associated with their avatar infrequently, e.g. switching between "locksmith" skill set to "safecracker" skill. However, in other instances the change may be more frequent or the characteristics/skills/weapons etc. are compatible with concurrently being active. For example, an avatar may have as their initial default weapon a small machine gun or rifle but can upgrade to larger caliber machine guns as well as acquiring, for example, a rocket launcher, a bazooka, a grenade launcher, or a shield. In some embodiments of the invention such as depicted in FIG. 6 multiple add-ons can be associated with an avatar or avatars through a hub 610 that communicates as depicted with gaming console 605 which is coupled to network 100. The gaming console 605 is also coupled to initial FIG. 630. The hub 610 supports multiple add-ons 620A to 620N respectively allowing the avatar associated with initial FIG. 630 to access these multiple add-ons 620A to 620N concurrently or very rapidly from one to another. In other embodiments of the invention such hubs may be unavailable or disabled such that the user must make a physical change of the add-on associated with their initial FIG. 630 or the gaming console 605 such that their reactions from firing a rifle to loading a rocket launcher, for example, are based upon their reaction timing and not a pre-built timing function within the game. In other embodiments of the invention the user may have to make a selection upon the hub 610 to activate a specific add-on 620A to 620N respectively. Selection of some add-on elements may within embodiments of the invention automatically disable other add-on elements.

Within embodiments of the invention add-ons may have limited life or duration within the game. For example, within a quest type adventure the avatar requires water and food in order to survive. Accordingly, as the user is typically starting from some location such as a town, castle, spaceship etc. they may be able to employ an initial number of add-ons that provide such essentials as food, water, fuel, ammunition etc. and balance the additional weight/logistics these imply with the risk of finding suitable supplies. Accordingly, a user may select an add-on of "1 Month Food" which is registered with the console and the add-on reduces at a rate commensurate with the game such that if it takes the user's avatar 5 days to cross a desert then the add-on is reduced by 5 days and the user's health improves/adjusts to reflect nutrition/hydration, for example. If the user's avatar makes the same crossing with only 2 days' rations, then their avatar's health reduces to reflect the 3 days of stressed exertion without nutrition and hydration. Loss of the add-on during its use may as with other add-ons and the initial figures themselves result in the benefit being lost completely such that the user's avatar suffers their owner's lack of care.

Figure 7:
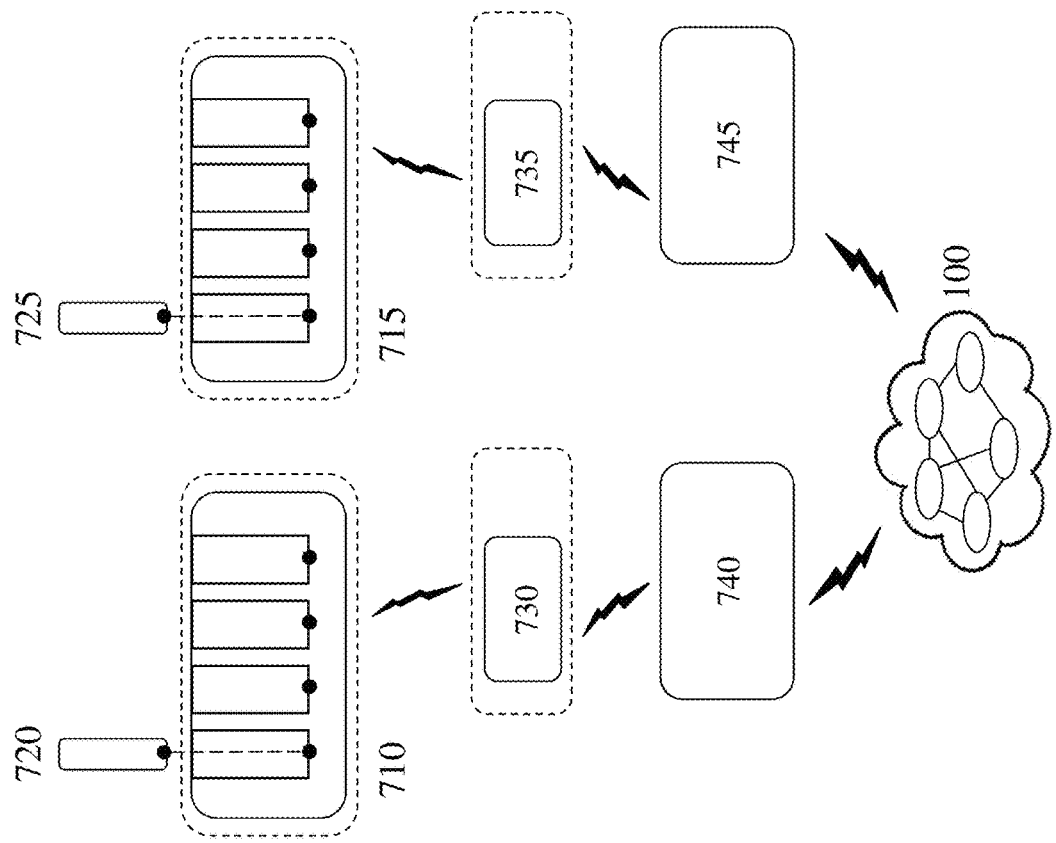
FIG. 7 depicts a schematic relating to transferring characteristics/parameters of an additional gaming element associated with a first player to an additional gaming element associated with a second player according to an embodiment of the invention.

Equally, within other embodiments of the invention a user may acquire additional add-ons for nutrition, water, fuel, etc. but their ability to employ these may be restricted such that they can only exploit these other add-ons when they reach a location or one location of a plurality of locations that could provide such resources, e.g. village, store, etc. However, within other embodiments of the invention the user's avatar within the game may, for example through the gaming engine itself running the game or through another avatar associated with another player, may acquire additional resources through a bartering activity. Accordingly, considering FIG. 7 a first user accesses a game via network 100 on their first gaming console 740 with first initial FIG. 730, first hub 710 and first add-on 720 whilst a second user accesses the game via the network 100 on their second gaming console 745 with second initial FIG. 735, second hub 715 and second add-on 725.

Accordingly, a gaming server, not shown for clarity, for example, tracks the brokering of a transaction between the first user's avatar and the second user's avatar relating to a resource, provision, etc. Once the brokered transaction is agreed the system communicates to the first and second add-ons 720 and 725 respectively via the appropriate intermediate elements, in this via first and second gaming consoles 740 and 745 respectively, first and second initial FIGS. 730 and 735 respectively, and first and second hubs 710 and 715 respectively. Accordingly, the appropriate value of the resource, provision etc. is securely removed from the selling party, e.g. second user and hence their add-on second add-on 725, and securely added to the purchasing party, e.g. first user and hence their add-on first add-on 725. Accordingly, the users directly gain/lose the resources from their add-on elements such that just as in the real world losing the add-on element itself results in loss of the resources, provisions, etc.

Within some of the embodiments of the invention described and depicted supra in respect of FIGS. 1 to 7 it has been stated that the initial figures store data relating to one or more avatar aspects including, but not limited to, the avatar's performance, an avatar characteristic, the avatar's progress, an avatar's traits, etc. Similarly, add-on elements store data relating to one or more add-on aspects including, but not limited to, an add-on element performance, an add-on level, an add-on feature, and an add-on function. In each such instance the physical loss of the initial figure and/or add-on element results in loss of the avatar associated with the initial figure and/or the features etc. of the add-on element. Accordingly, it is necessary that the data stored within the initial figure and/or add-on be secured in a manner preventing direct duplication, copying, forging, etc. In a similar manner, as an avatar with increased experience, higher level characteristics, performance, etc. has increased "value" it would be beneficial for so-called "cheats", "quick power-ups" and other mechanisms to artificially accelerate an avatar's performance, characteristics, skills etc. to be nullified as absent certain specific data or sequences of specific data the game does not recognize the modified initial figure and/or add-on element.

Figure 8:
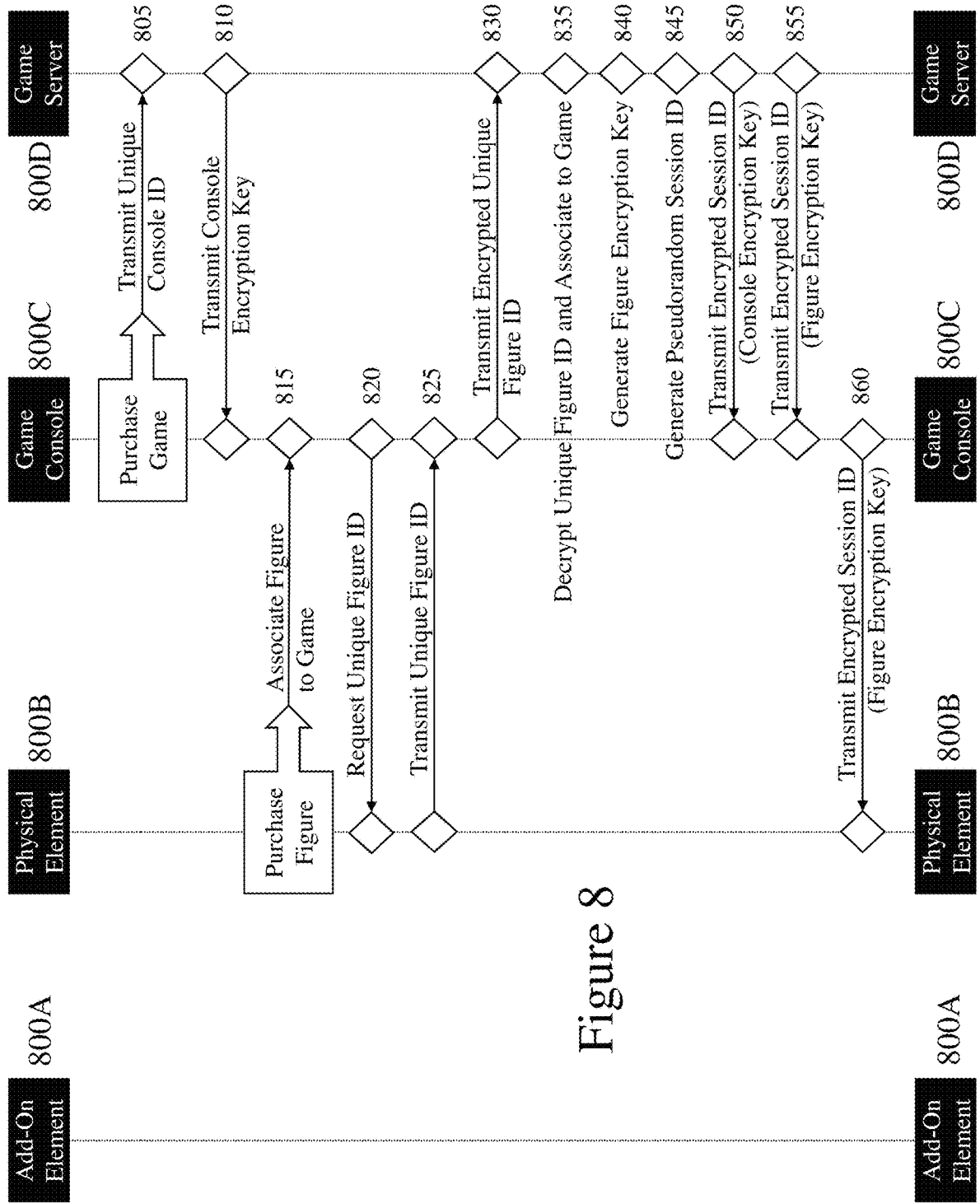
FIG. 8 depicts an exemplary communication flow with respect to acquiring and registering a game and initial figure with a gaming server according to an embodiment of the invention.

Now referring to FIG. 8 there is depicted an exemplary communication flow with respect to acquiring and registering a game and initial figure with a gaming server according to an embodiment of the invention. Accordingly, the process flow depicts four elements within the system, these being Add-On Element (ADON) 800A, Physical Element (PHYSEL) 800B, Game Console (console) 800C, and Game Server (server) 800D. A PHYSEL 800B may be a CHARDEV 208 as described and depicted supra in respect of FIG. 2 and discussed in respect of FIGS. 3 to 7 respectively.

Accordingly, as depicted in FIG. 8, the exemplary communication flow is based around 12 steps identified as first to twelfth steps 805 to 860 respectively. First to sixth steps 805 to 830 relate to initial associations and comprise:

First step 805 where the user purchases a game, installs (loads) it and registers it with the game console to the game server such that a unique console identifier (CON-ID) is communicated from the game console to the game server;

Second step 810 wherein the game server communicates to the console a unique encryption key for the game-console combination (GAME-KEY);

Third step 815 wherein the user purchases a PHYSEL and associates it with a game when they are playing the game on the game console;

Fourth step 820 wherein the gaming console requests the unique PHYSEL identity (PHYSEL-ID) of the PHYSEL;

Fifth step 825 wherein the PHYSEL transmits the unique PHYSEL-ID to the console; and Sixth step 830 wherein the console transmits the unique PHYSEL-ID to the game server encrypted with the GAME-KEY.

Accordingly, in first to sixth steps 805 to 830 the user has acquired and registered their game and a PHYSEL 800B wherein a unique identity (PHYSEL-ID) of the PHYSEL 800B is registered on a game server 800D in association with the console 800C and game. Seventh to twelfth steps 835 to 860 relate to generating a game session identity and this being stored within the PHYSEL 800B and console 800C. These steps comprising:

Seventh step 835 wherein the server decrypts the unique PHYSEL-ID;

Eighth step 840 wherein the server generates a unique PHYSEL encryption key (PHYSEL-KEY);

Ninth step 845 wherein the server generates a pseudorandom session identity (SES-ID);

Tenth step 850 wherein the server transmits the SES-ID to the console encrypted with the GAME-KEY;

Eleventh step 855 wherein the server transmits the SES-ID to the console encrypted with the PHYSEL-KEY; and Twelfth step 860 wherein the console transmits the SES-ID encrypted with the PHYSEL-KEY to the PHYSEL.

Figure 9:
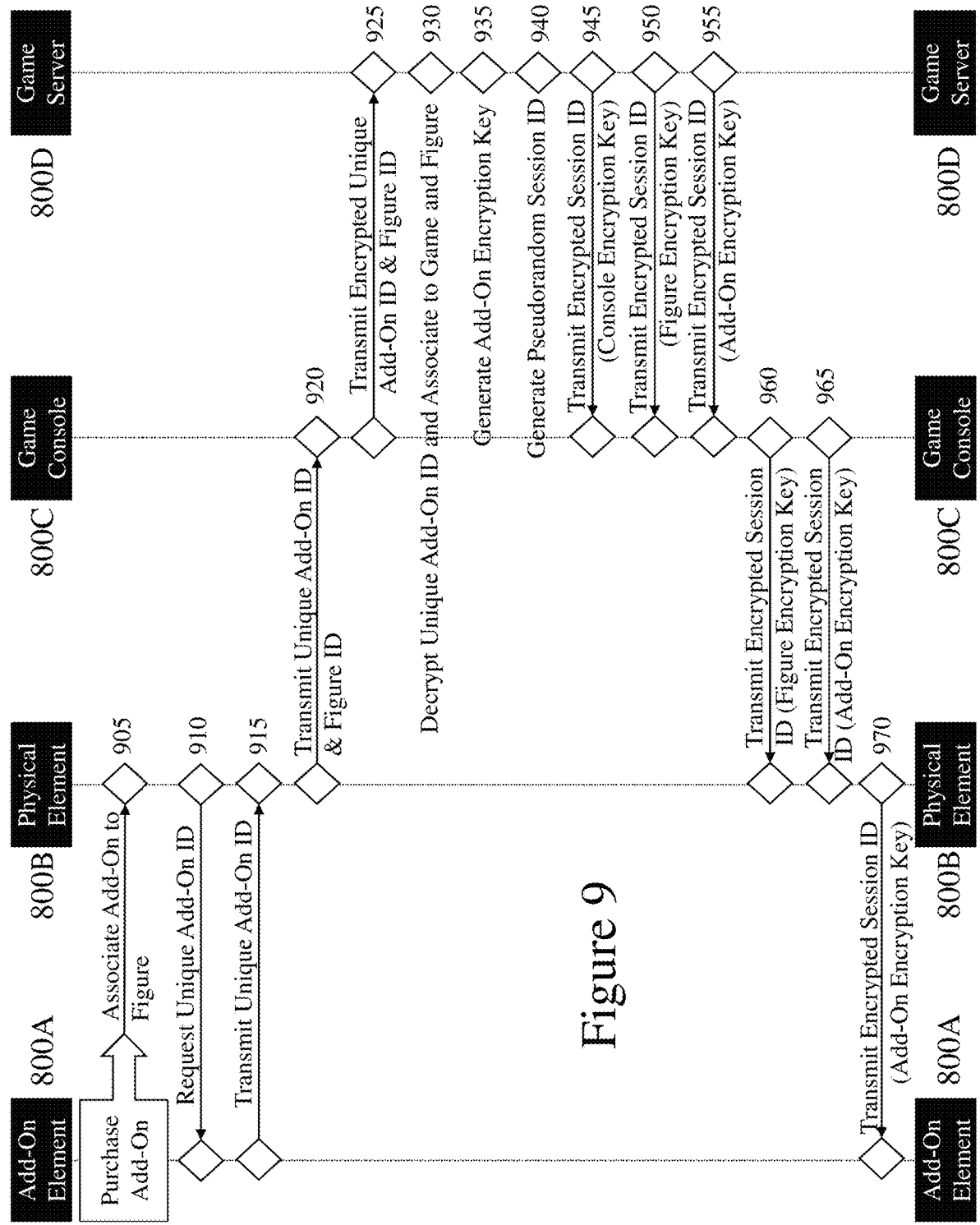
FIG. 9 depicts an exemplary communication flow with respect to acquiring, registering, and associating an add-on element to a figure/game with a gaming server according to an embodiment of the invention.

Referring to FIG. 9 there is depicted an exemplary communication flow with respect to acquiring, registering, and associating an add-on element to a figure/game with a gaming server according to an embodiment of the invention. Accordingly, the process flow depicts four elements within the system, these being Add-On Element (ADON) 800A, Physical Element (PHYSEL) 800B, Game Console (console) 800C, and Game Server (server) 800D. Accordingly, as depicted in FIG. 9, the exemplary communication flow is based around 14 steps identified as first to fourteenth steps 905 to 970 respectively. First to fifth steps 905 to 925 relate to initial associations and comprise:

First step 905 where the user purchases an add-on element (ADON) for a figure (PHYSEL) game and associates it with the PHYSEL;

Second step 910 wherein the PHYSEL requests the unique ADON identity (ADON-ID) of the ADON;

Third step 915 wherein the ADON transmits the unique ADON-ID to the PHYSEL;

Fourth step 920 wherein the PHYSEL transmits the unique ADON-ID to the console together with its own identity, PHYSEL-ID; and Fifth step 925 wherein the console encrypts and transmits both the PHYSEL-ID and ADON-ID to the game server which have been encrypted with the GAME-KEY.

Accordingly, in first to fifth steps 905 to 925 the user has acquired and registered their add-one element 800A, via its unique identity ADON-ID, to the game server 800D in association with the console 800C and game. Sixth to fourteenth steps 930 to 970 relate to generating a game session identity and this being stored within the PHYSEL 800B and console 800C. These steps comprising:

Sixth step 930 wherein the server decrypts the unique ADON-ID and associates it to the game and the PHYSEL;

Seventh step 935 wherein the server generates a unique ADON encryption key (ADON-KEY);

Eighth step 940 wherein the server generates a new pseudorandom session identity (NEWSES-ID);

Ninth step 945 wherein the server transmits the NEWSES-ID to the console encrypted with the GAME-KEY;

Tenth step 950 wherein the server transmits the NEWSES-ID to the console encrypted with the PHYSEL-KEY;

Eleventh step 955 wherein the server transmits the NEWSES-ID to the console encrypted with the ADON-KEY;

Twelfth step 960 wherein the console transmits the NEW SES-ID encrypted with the PHYSEL-KEY to the PHYSEL;

Thirteenth step 965 wherein the console transmits the NEWSES-ID encrypted with the ADON-KEY to the PHYSEL; and Fourteenth step 970 wherein the PHYSEL transmits the NEWSES-ID encrypted with the ADON-KEY to the ADON.

It would be evident to one of skill in the art that within the embodiment of the invention described and depicted with respect to FIG. 9 the ADON 800A communicates only to the PHYSEL 800B, which itself only communicates to the console 800C, and therein this communicates via a network 100 to a remote server 800D. In FIG. 8 similar communication limits are implied between the PHYSEL 800B, console 800C and server 800D. However, in other embodiments of the invention alternate communications may be employed, such as the ADON 800A communicating directly with the console 800C and the console 800C associating the ADON 800A to the PHYSEL 800B based upon both being active for example. In such scenarios the ADON 800A and console 800C may communicate directly without intermediate steps to and from the PHYSEL.

Within other embodiments of the invention these preliminary communications establishing identities/associations etc. of the ADON 800A, PHYSEL 800B, console 800C and server 800D may also include additional data relating to the associated component. It would be evident that through the establishment of encrypted session IDs being stored within the ADON 800A and/or PHYSEL 800B that these encrypted session IDs act as a digital fingerprint for each ADON 800A and PHYSEL 800B that can be subsequently read during an initial association phase of the ADON 800A and/or PHYSEL 800B within a new gaming session to verify the ADON 800A and/or PHYSEL 800B. Once the ADON 800A and/or PHYSEL 800B has been associated its fingerprint is modified and hence any subsequent ADON 800A and/or PHYSEL 800B with the original fingerprint will be now storing an invalid fingerprint. Accordingly, copying and selling an ADON 800A and/or PHYSEL 800B leaves every ADON 800A and/or PHYSEL 800B apart from the next one associating invalid. Further, the storage of the fingerprint of an ADON 800A and/or PHYSEL 800B with its characteristics prevents someone seeking to artificially boost their ADON 800A and/or PHYSEL 800B as discrepancy is detectable.

Figure 10:
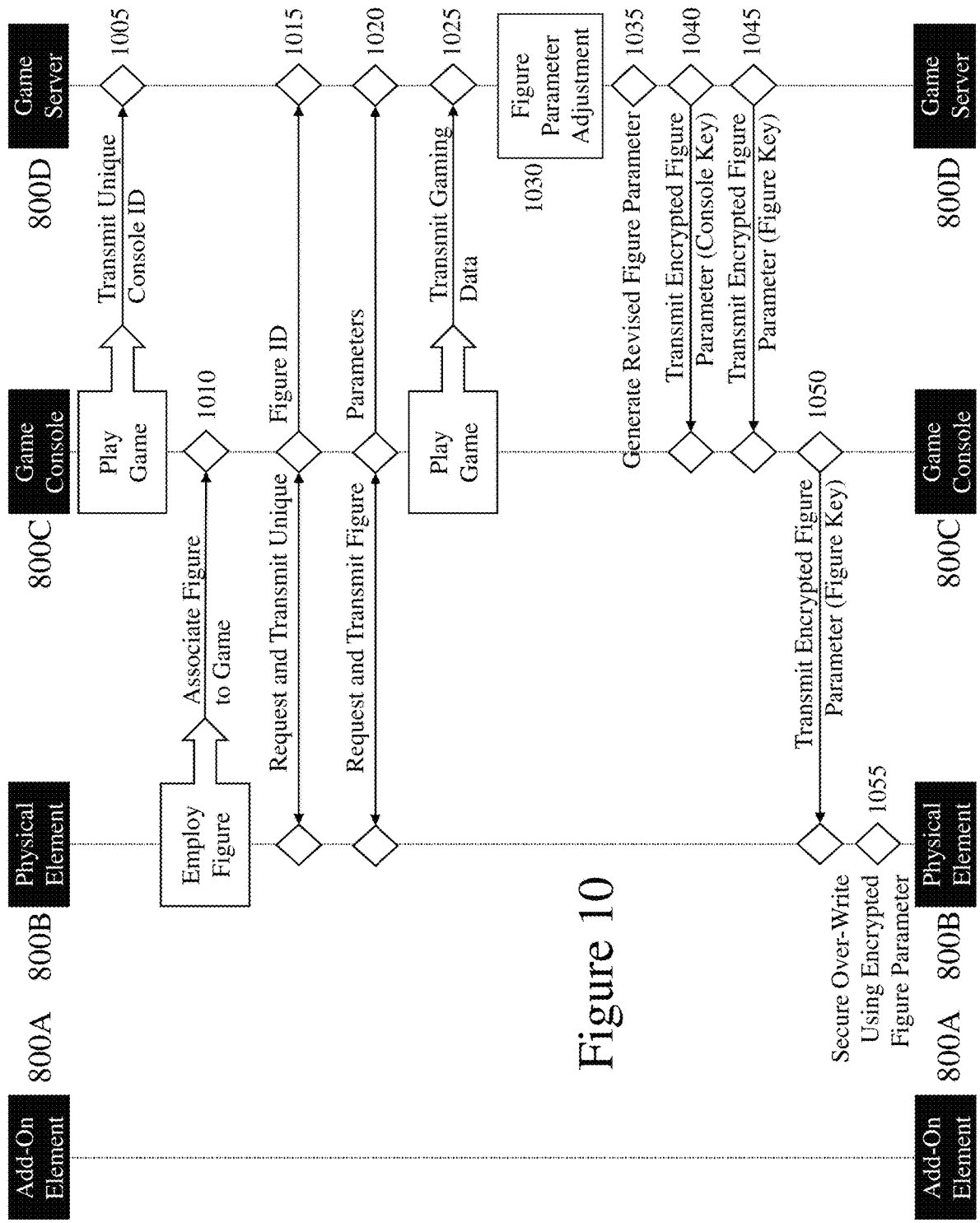
FIG. 10 depicts an exemplary communication flow with respect to gaming progress for a figure within a game employing a gaming server according to an embodiment of the invention.

Now referring to FIG. 10 there is depicted an exemplary communication flow with respect to gaming progress for a figure within a game employing a gaming server according to an embodiment of the invention. Accordingly, there are depicted first to eleventh steps 1005 to 1055 respectively for such an exemplary process. For simplicity a process step may comprise one or more communications towards a particular component as well as one or more communications away from that particular element. Accordingly, referring to first to sixth 1005 to 1030 respectively these comprise:

First step 1005 where the user starts a game by accessing it on their console that triggers communication of the CON-ID to the server 800D wherein it is stored together with the session ID;

Second step 1010 wherein the user associates a PHYSEL with the console and game they are playing;

Third step 1015 wherein the user associates a PHYSEL with the console and game they are playing wherein the PHYSEL-ID is transmitted to the server from the PHYSEL via the console after a request from the console;

Fourth step 1020 wherein the associated PHYSEL now provides parameter data relating to the PHYSEL to the server from the PHYSEL via the console after a request from the server for these parameters, where this parameter data relates at least to the characteristics/values of the characteristics of the avatar associated with the PHYSEL;

Fifth step 1025 wherein the user plays the game resulting in the transmission of gaming data to/from the server; and Sixth step 1030 wherein the resulting game activity results in adjustment of the avatar's characteristics/values of their characteristics.

Now having executed game activity and adjustments of the avatar's characteristics/values of their characteristics the process continues with seventh to eleventh steps 1035 to 1055 respectively. These steps comprise:

Seventh step 1035 wherein the adjustment of the avatar's characteristics/values of their characteristics resulting from the gaming activity are converted to revised PHYSEL parameter(s);

Eighth step 1040 wherein the revised PHYSEL parameter(s) are encrypted with the GAME-KEY and transmitted to the console;

Ninth step 1045 wherein the revised PHYSEL parameter(s) are encrypted with the PHYSEL-KEY and transmitted to the console;

Tenth step 1050 wherein the revised PHYSEL parameter(s) encrypted with the PHYSEL-KEY are transmitted from the console to the PHYSEL; and Eleventh step 1055 wherein a secure over-write of the PHYSEL parameter(s) with the encrypted revised PHYSEL parameter(s) is performed such that the previous PHYSEL parameter(s) are now inaccessible.

It would be evident that in addition to storing encrypted revised PHYSEL parameter(s) as described in respect of FIG. 10 and session identity in FIG. 9 that additional information may be encrypted and stored such as timing information, location information, unique identity of transmission of encrypted revised PHYSEL parameter, etc. In this manner, the PHYSEL may store a full chronological history of usage for matching to server based records allowing, for example, the server to validate a PHYSEL.

Figure 11:
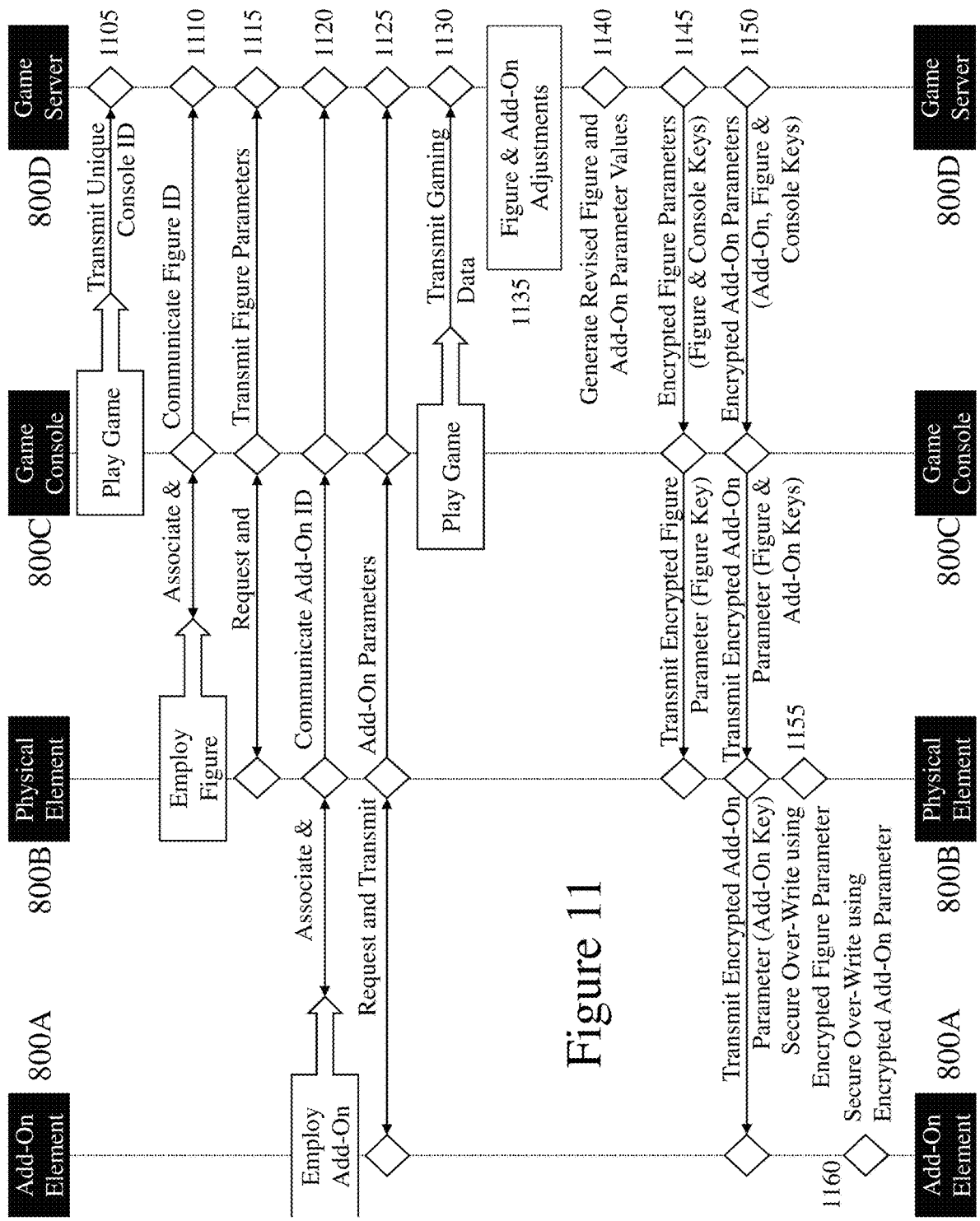
FIG. 11 depicts an exemplary communication flow with respect to gaming progress for an add-on element associated with a figure within a game employing a gaming server according to an embodiment of the invention.

Referring to FIG. 11 there is depicted an exemplary communication flow with respect to gaming progress for an add-on element associated with a figure within a game employing a gaming server according to an embodiment of the invention. Accordingly, there are depicted first to twelfth steps 1105 to 1160 respectively for such an exemplary process. For simplicity a process step may comprise one or more communications towards a particular component as well as one or more communications away from that particular element. Accordingly, referring to first to sixth 1105 to 1130 respectively these comprise:

First step 1105 where the user starts a game by accessing it on their console that triggers communication of the CON-ID to the server 800D wherein it is stored together with the session ID;

Second step 1110 wherein the user associates a PHYSEL with the console and game they are playing, and the PHYSEL-ID is transmitted to the server from the PHYSEL via the console after a request from the console;

Third step 1115 wherein the associated PHYSEL now provides parameter data relating to the PHYSEL to the server from the PHYSEL via the console after a request from the server for these parameters, where this parameter data relates at least to the characteristics/values of the characteristics of the avatar associated with the PHYSEL;

Fourth step 1120 wherein the user associates an ADON with the PHYSEL, console and game and the ADON-ID is transmitted to the server via the PHYSEL and console after a request from the console;

Fifth step 1125 wherein the associated ADON now provides parameter data relating to the ADON to the server from the ADON via the PHYSEL and console after a request from the server for these parameters, where this parameter data relates at least to the characteristics/values of the characteristics of the add-on element associated with the PHYSEL and/or game;

Sixth step 1130 wherein the resulting game activity results in adjustment of the avatar's characteristics/values of their characteristics and gaming data being transmitted to the server.

Now having executed game activity and adjustments of the avatar's characteristics/values of their characteristics the process continues with seventh to twelfth steps 1135 to 1160 respectively. These steps comprise:

Seventh step 1135 wherein the adjustment of the avatar's characteristics/values of their characteristics resulting from the gaming activity are made Eighth step 1140 wherein revised PHYSEL and/or ADON parameter(s) are established;

Ninth step 1145 wherein the revised PHYSEL parameter(s) are encrypted with the GAME-KEY and PHYSEL-KEY and transmitted to the console from the server and thereafter the PHYSEL-KEY encrypted revised PHYSEL parameter(s) are transmitted to the PHYSEL;

Tenth step 1150 wherein the revised ADON parameter(s) are encrypted with the GAME-KEY, PHYSEL-KEY, and ADON-KEY and transmitted to each of the console, PHYSEL, and ADON via the intermediate ones of the console and PHYSEL;

Eleventh step 1155 wherein a secure over-write of the PHYSEL parameter(s) with the encrypted revised PHYSEL parameter(s) is performed such that the previous PHYSEL parameter(s) are now inaccessible; and Twelfth step 1160 wherein a secure over-write of the ADON parameter(s) with the encrypted revised ADON parameter(s) is performed such that the previous ADON parameter(s) are now inaccessible.

It would be evident to one of skill in the art that within the embodiment of the invention described and depicted with respect to FIG. 11 the ADON 800A communicates only to the PHYSEL 800B, which itself only communicates to the console 800C, and therein this communicates via a network 100 to a remote server 800D. In FIG. 10 similar communication limits are implied between the PHYSEL 800B, console 800C and server 800D. However, in other embodiments of the invention alternate communications may be employed, such as the ADON 800A communicating directly with the console 800C and the console 800C associating the ADON 800A to the PHYSEL 800B based upon both being active for example. In such scenarios the ADON 800A and console 800C may communicate directly without intermediate steps to and from the PHYSEL.

Within other embodiments of the invention these preliminary communications establishing identities/associations etc. of the ADON 800A, PHYSEL 800B, console 800C and server 800D may also include additional data relating to the associated component. It would be evident that through the establishment of encrypted session IDs being stored within the ADON 800A and/or PHYSEL 800B that these encrypted session IDs act as a digital fingerprint for each ADON 800A and PHYSEL 800B that can be subsequently read during an initial association phase of the ADON 800A and/or PHYSEL 800B within a new gaming session to verify the ADON 800A and/or PHYSEL 800B. Once the ADON 800A and/or PHYSEL 800B has been associated its fingerprint is modified and hence any subsequent ADON 800A and/or PHYSEL 800B with the original fingerprint will be now storing an invalid fingerprint. Accordingly, copying and selling an ADON 800A and/or PHYSEL 800B leaves every ADON 800A and/or PHYSEL 800B apart from the next one associating invalid. Further, the storage of the fingerprint of an ADON 800A and/or PHYSEL 800B with its characteristics prevents someone seeking to artificially boost their ADON 800A and/or PHYSEL 800B as discrepancy is detectable.

It would be evident to one of skill in the art how variations of the process flows depicted in FIGS. 8 to 11 may support secure storage of data relating to add-on elements, avatars via their physical elements, etc. as well as actions such as bartering, purchases etc. For example, a purchase results in the reduction of one parameter (e.g. money) and the increase of another (e.g. fuel, ammunition, food, etc.) such that these new revised parameters are securely over-written within the PHYSEL and/or ADON. A barter may result in the reduction of one or more parameters (e.g. money, fuel, ammunition, treasure) of one avatar and an increase of one or more parameters (e.g. money, fuel, ammunition, treasure) of another avatar such that these new revised parameters are securely over-written within the PHYSEL and/or ADON of each.

Figure 12:
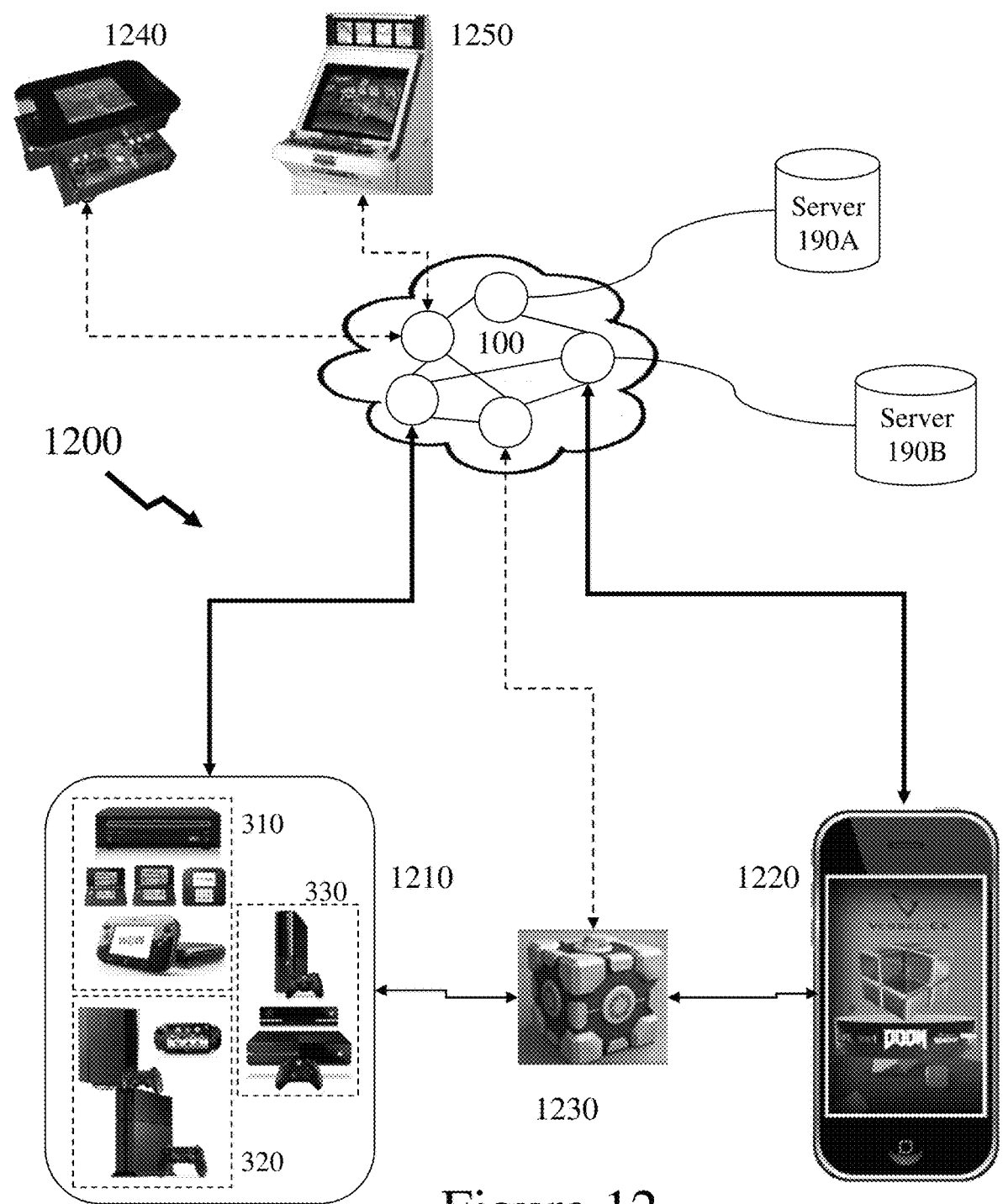
FIG. 12 depicts an exemplary network configuration within which embodiments of the invention may be employed exploiting console and mobile device interfaces to a gaming figure.

Now referring to FIG. 12 there is depicted an exemplary network environment according to an embodiment of the invention wherein a user may exploit a gaming environments either within a console environment 1210 through first to third console groups 310 to 330 respectively representing different portable and fixed console options 310 to 330 respectively such as described and depicted supra in respect of FIG. 3 and/or via a software application such as a GESAP according to an embodiment of the invention in execution upon a PED 1220, such as a smartphone for example. In each instance, the gaming figure or PHYSEL 1230 communicates to the console environment 1210 and PED 1220 and therein through network 100 to one or more servers, such as first and second servers 190A and 190B respectively. However, in other embodiments of the invention the PHYSEL 1230 may, according to the design and functionality embedded within it, communicate to the one or more servers directly. Alternatively, the PHYSEL 1230 may be employed with one or more arcade gaming systems such as first and second arcade systems 1240 and 1250 respectively.

Figure 13:
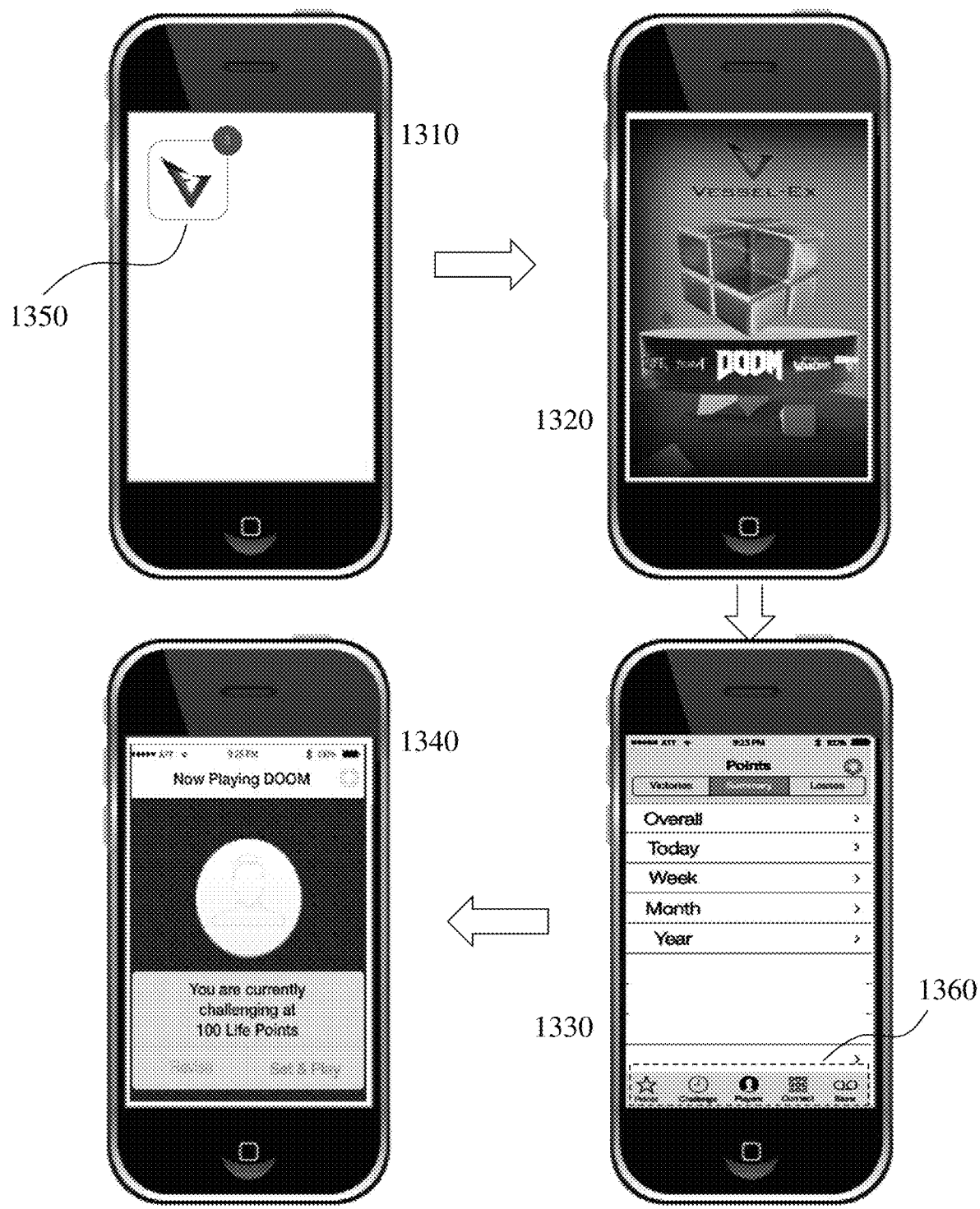
FIGS. 13 and 14 depict exemplary screen shots from a software application in execution upon a portable electronic device supporting embodiments of the invention.

Now referring to FIG. 13 there are depicted first to fourth screenshots 1310 to 1340 relating to a user accessing a GESAP upon a PED such as PED 1220 in FIG. 12. Accordingly, in first screenshot 1310 the user selects an icon 1350 which launches the GESAP as depicted in second screenshot 1320. The GESAP may, as depicted, allow the user to interface to multiple gaming applications which the user associates with their GESAP through a process as known in the art. Alternatively, the GESAP may be associated with a gaming franchise, e.g. Call of Duty™, Final Fantasy™, or Star Wars™ or a gaming manufacturer, e.g. EA Sports™ or Disney™. Optionally, the GESAP may be associated with a single game.

Depending upon the GESAP once the user accesses or selects a specific game the user may be presented with a screen such as that depicted in third screenshot 1330 which is a summary screen for the user's character as defined by the PHYSEL associated with the GESAP. From the summary screen the user may view alternate screens depicted victories or losses. Common to these different displays is toolbar 1360 which has icons that trigger links to other screens associated with "Points", "Challenge", "Players", "Contract", and "Store." For example, through "Challenge" the user may, within games supporting such functionality whereby they are linked to a screen, such as fourth screenshot 1340 wherein the screen shows that the user is currently challenging another user for a specific reward/loss within the game "Doom." If the user wins then their avatar/PHYSEL increases by "100 Life Points" whilst if they lose their avatar/PHYSEL decreases by "100 Life Points."

Figure 14:
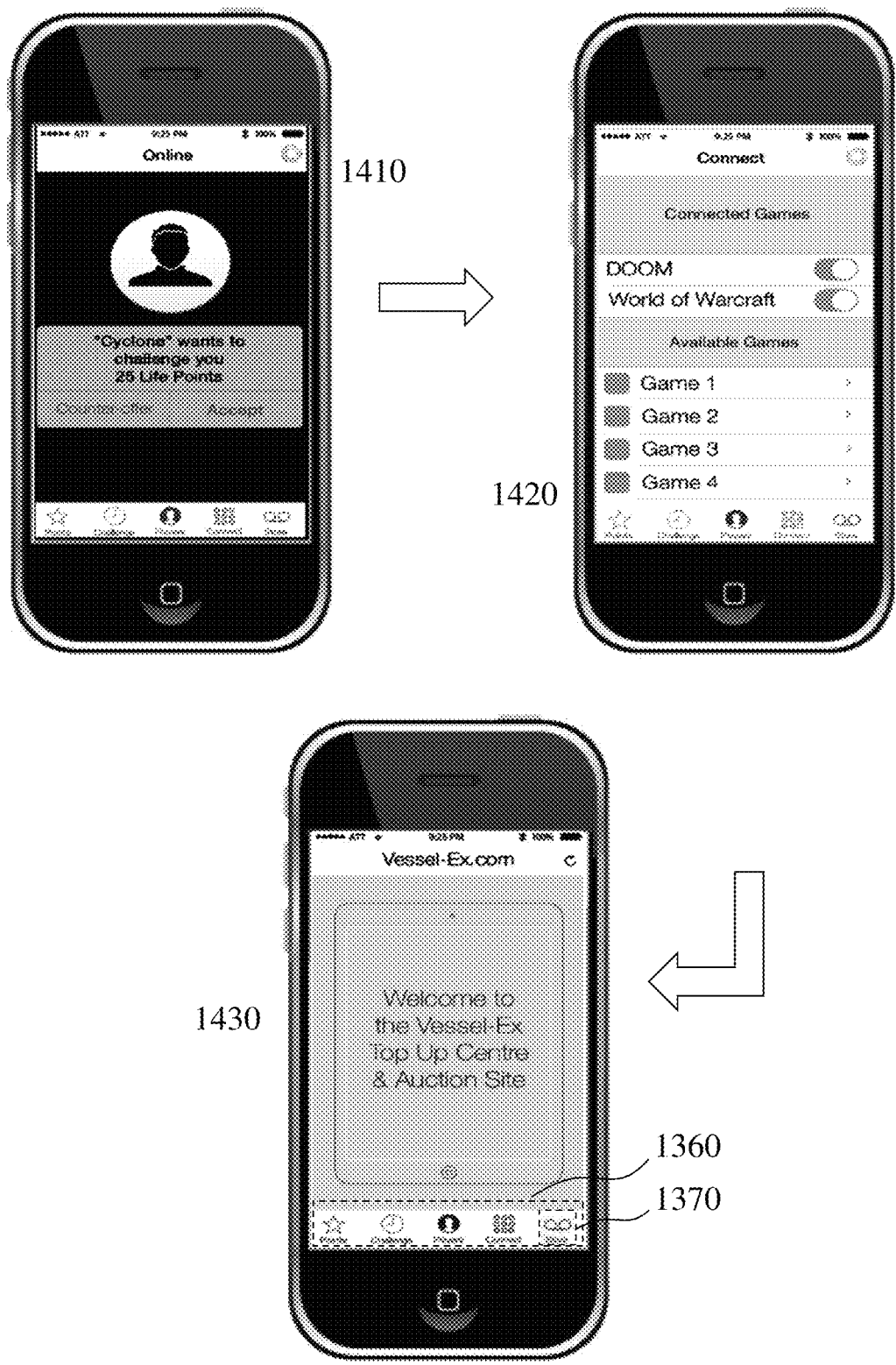

Referring to FIG. 14 there are depicted first to third screenshots 1310 to 1330 relating to a user accessing a GESAP upon a PED such as PED 1220 in FIG. 12. In first screenshot 1410 the user is denoted as being "Online" and is being challenged by another user, "Cyclone", for "25 Life Points" and has the option to accept or make a counter offer with respect to the challenge. Within second screenshot 1420 the user has accessed a screen relating to their games denoting that the user has "Doom" and "World of Warcraft" as connected games and "Game 1", "Game 2", "Game 3", and "Game 4" as available games. Within third screenshot 1430 the user has selected "Store" wherein they can perform different functions such as purchasing new games, purchase new upgrades, theme packs, avatars/characters/PHYSELs etc.

Within the description supra in respect of embodiments of the invention and FIGS. 1 to 14 a gamer purchases and employs a PHYSEL/CHARDEV supporting embodiments of the invention, this PHYSEL/CHARDEV within the following description being referred to as "Vessel-Ex™." Vessel-Ex™ within this embodiment is a standalone device wirelessly enabled, e.g. Bluetooth, which collects and passes information in the form of collectable "life points" back and forth between itself and Vessel-Ex™ of other competitors from all over the world from the comfort of the user's home, office, etc. Accordingly, Vessel-Ex™ allows a user to "up the ante" in their online gaming either between friends, casual gamers, or avid gamers that want to prove themselves to be the best gamer at any one particular participating game. Accordingly, the player (user) is able to wager "life points" or enter online competitions within particular forums, such as X-Box Live™ or PlayStation™ games using "life points" to compete where no money is exchanged. However, "life points" are collectable/deductible so that the "life points" of the user's Vessel-Ex™ can be increased by collecting points lost by their competitor to them during their gaming against the competitor or can be decreased by losing points to their competitor during their gaming against the competitor.

Within an embodiment of the invention each Vessel-Ex™ is initially acquired with a predefined number of "life points." This number of "life points" may be established, for example, by a tier, rank, or level of the Vessel-Ex™ acquired or alternatively they may be established based upon the progress of an avatar associated with the Vessel-Ex™ within the game. Accordingly, user's avatar may increase/decrease "life points" through regular game play as well as increase/decrease as a result of specific "dueling" (duels) or challenges between players through or outside of the game itself. Optionally, the "life points" of a Vessel-Ex™ may be limited solely to game play or solely "duel/challenge" play. Similarly, a Vessel-Ex™ may have its "life points" associated with a single game title or alternatively a gaming franchise, a game publisher, etc. wherein the user may employ the Vessel-Ex™ within any game supporting the Vessel-Ex™ discretely or supporting the avatar associated with the Vessel-Ex™. Where the game requires an associated supported avatar, it would be evident that the "life points" may or may not equate within different games.

Within embodiments of the invention there may be discrete tournaments or competitions to which user register/join or there may be "free-for-all" challenging so that any player can challenge any other player or the players available for challenging may be determined by factors such as current "life points", geography, game, challenges made and/or accepted, challenges won and/or lost, etc. Some competitions may require a standard "buy in" of "life points" to enter the competition whereas in others the challenger and/or challenged users may set a wager level and/or modify a wager request. The goal is to be the best gamer and to collect the most life points catapulting you to the top of the Vessel-Ex leader boards.

Within the embodiments of the invention the Vessel-Ex™ is a discrete element, e.g. PHYSEL or CHARDEV, independent from any specific existing console or specific to a particular console. Similarly, the Vessel-Ex™ may be game independent, game specific, franchise specific, etc. In some embodiments the Vessel-Ex™ may be used to "power up" or increase the abilities/strength/characteristics of a gaming character and their avatar within a game, game franchise, etc. and provide the user with the ability to challenge other players in competitions to increase the "life points" of their Vessel-Ex™ either within the gaming environment, e.g. a player may challenge other players within a game within a particular environment within the gaming environment. For example, within a quest based multi-player online role playing game such a location may be a public house within a village or within a military team based game within a base but not during missions.

Within embodiments of the invention the Vessel-Ex™ becomes a collectable itself since the "life points" can be accumulated. However, if a player's "life points" drop to zero then their Vessel-Ex™ is "dead" and cannot be reset, revived etc. such that the gamer experiences an actual physical loss rather than a merely virtual one. Hence, there is invested "value" in the "life points." Accordingly, the Vessel-Ex™ becomes a trophy showcasing the gamers accomplishments in any one particular participating game or within a franchise, etc. The Vessel-Ex™ becomes something that is physical, portable and displayable independent of the gaming environment.

Optionally, as the Vessel-Ex™ "life points" increase then its online value may also increases allowing top gamers additional bonuses, power ups and advantages that can be acquired or accumulated. These may be accelerated therefore within the game for one player relative to another player as the player challenges and accumulates faster within and/or external to the game itself. Optionally, the more points you acquire the more exclusive you become and the more options that can be accessed. Hence, a user completing a first game within a franchise starts the next game at a higher level from their "life points" relative to another user with lower "life points." Equally, users can play mobile together without the online game such that their Vessel-Ex "life points" are modified based upon these challenges.

A Vessel-Ex™ that has been depleted to zero "life points" may, within some embodiments of the invention be re-activated but the re-activation may reset the avatar's game play back to the start of the game so that they must again progress and "work" (invest time) to progress again within the game. Optionally, a Vessel-Ex™ may be re-activated to a default "life points" level but leave the player where they were within the game. This is unlike prior art methods allowing a player to store their progress, play and reset to their stored progress with all their acquired health, equipment, etc. So, restarting further into the game provides an increased challenge as the Vessel-Ex™ "life points" are not reset to that point when the player last started.

Within some embodiments of the invention all Vessel-Ex™ information is stored within the Vessel-Ex™ device, with no access to this information in any online format. Accordingly, once updated and stored back into the Vessel-Ex™ the game does not store the "life points." In fact, within embodiments of the invention the communications to/from the Vessel-Ex™ are performed through a separate communications channel to those of the game such that the Vessel-Ex™ is not updated from the game but the remote server. In this manner, periodic polling of the Vessel-Ex™ may be undertaken so that the Vessel-Ex™ must be presented and in communications with the console/PED/FED etc. in order for gaming to continue. Similarly, "reviving" an expired Vessel-Ex™ may provide all the necessary information for the Vessel-Ex™ as the prior data is not only deleted but over-written by the Vessel-Ex™ so that it is not recoverable making it that much more exclusive. Optionally, the data upon the Vessel-Ex™ may be encrypted and the encryption key deleted/over-written for speedier deletion of the Vessel-Ex™ when the "life points" reach zero.

Optionally, the Vessel-Ex™ may support collectable and customizable avatars that can be attached to the Vessel-Ex™ or these may be physically combined at initial acquisition. Optionally, as described and depicted supra the Vessel-Ex™ may be "customized" based upon data acquired from the "avatar" attached to it. Optionally, where the Vessel-Ex™ device supports multiple "avatars" and multiple games then the current active "avatar" is defined by the physically attached element. Optionally, the user may select an "avatar" from a menu within the game where the game detects multiple "avatars" supported by the game.

Optionally, the Vessel-Ex™ may include LED lights and/or a display that light up to show visual progress of a user's experience. For example, through multi-colour LEDs a visual colour change may denote progression between ranks and brightness indicates progression within the rank. Optionally, only colour or brightness may be employed. Optionally, with a display the Vessel-Ex™ may present a visual indicator, a number, a ranking etc. as well as adjusting colour and/or brightness discretely or in combination with LEDs. A flashing LED may indicate critically low "life points" whilst no lights indicate a "dead" Vessel-Ex™ or one where the Vessel-Ex™ "life points" have reduced to zero.

If a Vessel-Ex™ "life points" are reduced to zero, then the Vessel-Ex™ is wiped but may be revived to its original factory settings. This presents the player with a risk versus reward that does not exist within the game itself.

As described and depicted in respect of FIGS. 12 to 14 and elsewhere the Vessel-Ex™ may be employed in conjunction with a Vessel-Ex™ mobile application, a GESAP according to an embodiment of the invention, which may be downloaded and allows the user to access and/or interact with their Vessel-Ex™ independent of a gaming console etc. The GESAP allows a user to review their "avatar" information, wins, losses, purchases and accumulated "life points". An online store may be accessible through the GESAP wherein gamers can reload their Vessel-Ex™ and/or auction existing Vessel-Ex™ to sell to those who don't want to put the work in. Additional power-ups, tools, bonuses etc. may be available for specific games and may be purchased through "life points" or in some instances through a financial transaction.

Beneficially, the remote servers will collect information pertaining to the gamer and the gamers online experience through their Vessel-Ex™ interfaces allowing the Vessel-Ex™ user experience to be monitored and improved through analytics pertaining to usage, types of games played, challenges, etc. for use with participating game partners/developers.

Optionally, the GESAP in conjunction with the Vessel-Ex™ may provide the user with voice and/or video communications to another user, be it a friend participating with them in game play or a challenger. Optionally, the GESAP may also support functionality allowing users to access a social network.

The death/destruction of an avatar or element associated with an avatar, i.e. its health, power, etc. reaching zero may therefore leave remaining assets for another avatar of the player or another player to acquire. As the "dead/destroyed" avatar or element now does not interact within the game the system may display the "dead/destroyed" avatar or element irrespective of the PHYSEL association to the game allowing remaining assets to be acquired by removing them. This may represent in many instances the only time an avatar is depicted within the game when their PHYSEL is not physically associated.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
providing an electronic device comprising a first microprocessor for executing software instructions stored within a first non-volatile, non-transitory memory of the electronic device relating to a game and a first wireless interface according to a predetermined standard; and
providing a physical element associated with a user comprising a second microprocessor and a second non-volatile, non-transitory memory for storing data relating to an avatar within the game and a second wireless interface according to the predetermined standard; wherein
the avatar is only active within the game when the physical element is associated with the electronic device through the first wireless interface and second wireless interface;
the data stored within the physical element is securely stored and updated by the second microprocessor in dependence upon the actions of the user with the avatar within the game;
when the data satisfies a predetermined condition the avatar is terminated and cannot be restored; and
when the data satisfies the predetermined condition the data within the physical element is securely erased.

2. The method according to claim 1, wherein
the data relating to the avatar stored within the second non-volatile, non-transitory memory is not stored within the game or within another memory such that loss of the physical element results in loss of both the data relating to the avatar and the avatar.

3. The method according to claim 1, wherein
the electronic device is selected from the group comprising a gaming console, a portable electronic device, a fixed electronic device, an arcade game, and a terminal.

4. The method according to claim 1, wherein
the game allows the user to at least one of challenge another user and be challenged by another user with respect to a challenge reward, wherein
the loser of the challenge has the challenge reward removed from their avatar's persona and subtracted from the data stored within the physical element associated with their avatar; and
the winner of the challenge has the challenge reward added to their avatar's persona and added to the data stored within the physical element associated with their avatar.

5. A method comprising:
providing an electronic device comprising a first microprocessor for rendering data received from a remote server relating to a game via a first interface, bi-directionally transmitting data via the first interface to a network, and bi-directionally transmitting data via a first wireless interface according to a predetermined standard; and
providing a physical element associated with a user comprising a second microprocessor and a second non-volatile, non-transitory memory for storing data relating to an avatar within the game and a second wireless interface according to the predetermined standard; wherein
the avatar is only active within the game when the physical element is associated with the electronic device through the first wireless interface and second wireless interface;
the data stored within the physical element is securely stored and updated by the second microprocessor in dependence upon the actions of the user with the avatar within the game;
when the data satisfies a predetermined condition the avatar is terminated and cannot be restored; and
when the data satisfies the predetermined condition the data within the physical element is securely erased.

6. The method according to claim 5, wherein
the first interface is either a wired interface or a wireless interface.

7. The method according to claim 5, wherein
the data relating to the avatar stored within the second non-volatile, non-transitory memory is not stored within the game or within another memory such that loss of the physical element results in loss of both the data relating to the avatar and the avatar.

8. The method according to claim 5, wherein
the electronic device is selected from the group comprising a gaming console, a portable electronic device, a fixed electronic device, an arcade game, and a terminal.

9. The method according to claim 5, wherein
the game allows the user to at least one of challenge another user and be challenged by another user with respect to a challenge reward, wherein
the loser of the challenge has the challenge reward removed from their avatar's persona and subtracted from the data stored within the physical element associated with their avatar; and
the winner of the challenge has the challenge reward added to their avatar's persona and added to the data stored within the physical element associated with their avatar.

10. A method comprising:
providing an electronic device comprising a first microprocessor, a display, a user input interface, a first non-volatile non-transitory memory (first memory) and a first interface operating according to a predetermined standard;
providing a physical element comprising a second microprocessor, a battery, a second non-volatile non-transitory memory (second memory) and a second interface operating according to the predetermined standard;
providing an add-on comprising a third non-volatile non-transitory memory (third memory) and a third interface operating according to a second predetermined standard;
providing a fourth interface forming part of the physical element operating according to the second predetermined standard; and
executing a software application upon the electronic device providing an avatar to a user of the electronic device; wherein
the physical element stores avatar data relating to the avatar;
the software application associates the physical element to the electronic device via a link established between the first interface and the second interface;
the avatar can only be employed within the software application when the physical element is associated with the electronic device and a first portion of the avatar data indicates the avatar is alive;

the add-on associates with the physical element via a link operating according to the second predetermined standard;

at least one of the electronic device, the add-on and the physical element is connected to a sensor via a wireless interface operating according to a third predetermined standard;

the sensor is one of a biometric sensor and an environmental sensor;

data acquired by the sensor is employed by the software application whilst the user is employing the software application and stored within the add-on;

updating at least the first portion of the avatar data in dependence upon one or more actions performed by the avatar within the software application, each action initiated by the user; and upon determining that the first portion of the avatar data indicates the avatar is not alive securely erasing the avatar data.

11. The method according to claim 10, wherein
the avatar within the software application cannot be accessed independent of the physical element being associated with the software application.

12. The method according to claim 10, wherein
the software application is one of a plurality of software applications, each providing the user with the avatar when executed with the physical element associated with the software application.

13. The method according to claim 10, wherein
at least one of the electronic device and the physical element is connected to a sensor via a wireless interface operating according to a second predetermined standard;

the sensor is one of a biometric sensor and an environmental sensor; wherein data is acquired by the sensor and communicated to the at least one of the electronic device and the physical element via the wireless interface and therein to the software application whilst the user is employing the software application.

14. The method according to claim 13, wherein
the acquired data from the sensor acquired whilst the user is employing the software application is employed within the software application either discretely or in combination with an action of the user with the user input interface to determine at least one of an action and an aspect of an action of the avatar within the software application.

15. The method according to claim 13, wherein
the acquired data from the sensor acquired whilst the user is employing the avatar within the software application is stored within the physical element; and the progress of the avatar within the software application is dependent upon both the decisions of the user within the software application with respect to the avatar and the stored acquired data.

16. The method according to claim 10, wherein
at least one of:
an aspect of the avatar associated with the physical element is adjusted in dependence upon the association of the add-on with the physical element;
an add-on may only become active with respect to the avatar when the avatar has achieved at least one of a predetermined threshold, objective, goal, and experience within the software application; and
the add-on may associate either with a specific physical element or with multiple physical elements.

17. A method comprising:
providing an electronic device comprising a first microprocessor, a display, a user input interface, a first non-volatile non-transitory memory (first memory) and a first interface operating according to a predetermined standard;

providing a physical element comprising a second microprocessor, a battery, a second non-volatile non-transitory memory (second memory) and a second interface operating according to the predetermined standard;

providing an add-on comprising a third non-volatile non-transitory memory (third memory) and a third interface operating according to a second predetermined standard;

providing a fourth interface forming part of the physical element operating according to the second predetermined standard; and executing a software application upon the electronic device providing an avatar to a user of the electronic device; wherein the physical element stores avatar data relating to the avatar;

the software application associates the physical element to the electronic device via a link established between the first interface and the second interface;

the avatar can only be employed within the software application when the physical element is associated with the electronic device and a first portion of the avatar data indicates the avatar is alive;

the add-on is associated with an item within the software application consumed in dependence upon at least one of an action of the avatar and a measure of time within the software application;

an item has at least one of a limited life and a defined duration;

the add-on is either usable once only or may be replenished in dependence upon the avatar within the software application achieving a specific goal or reaching a predetermined location;

updating at least the first portion of the avatar data in dependence upon one or more actions performed by the avatar within the software application, each action initiated by the user; and upon determining that the first portion of the avatar data indicates the avatar is not alive securely erasing the avatar data.

* * * * *